United States Patent
Park et al.

(10) Patent No.: US 10,038,466 B2
(45) Date of Patent: Jul. 31, 2018

(54) ELECTRONIC DEVICE INCLUDING NEAR FIELD COMMUNICATION DEVICE AND MOBILE SYSTEM HAVING THE SAME

(71) Applicant: Samsung Electronics Co., Ltd., Suwon-si, Gyeonggi-do (KR)

(72) Inventors: Jong-Seong Park, Suwon-si (KR); Jeong-Gu Lee, Suwon-si (KR); Tae-Seon Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/279,552

(22) Filed: Sep. 29, 2016

(65) Prior Publication Data

US 2017/0126267 A1 May 4, 2017

(30) Foreign Application Priority Data

Nov. 2, 2015 (KR) ........................ 10-2015-0153219

(51) Int. Cl.
| | |
|---|---|
| *H04B 1/3888* | (2015.01) |
| *H04L 29/06* | (2006.01) |
| *H04B 5/00* | (2006.01) |
| *H04W 4/00* | (2018.01) |
| *H04M 1/02* | (2006.01) |
| *H04W 4/80* | (2018.01) |
| *H04M 1/18* | (2006.01) |
| *H04M 1/725* | (2006.01) |

(52) U.S. Cl.
CPC ......... *H04B 1/3888* (2013.01); *H04B 5/0031* (2013.01); *H04B 5/0037* (2013.01); *H04M 1/185* (2013.01); *H04M 1/7253* (2013.01); *H04W 4/008* (2013.01); *H04W 4/80* (2018.02); *H04M 2250/04* (2013.01)

(58) Field of Classification Search
CPC ... H04B 1/3888; H04B 5/0037; H04W 4/008; H04M 1/0202; H04L 69/28
See application file for complete search history.

(56) References Cited

U.S. PATENT DOCUMENTS

| | | | |
|---|---|---|---|
| 7,793,121 | B2 | 9/2010 | Lawther et al. |
| 8,185,755 | B2 | 5/2012 | Yamasuge |
| 8,234,509 | B2 | 7/2012 | Gioscia et al. |
| 8,880,055 | B1 | 11/2014 | Clement et al. |
| 8,898,489 | B2 | 11/2014 | Sultenfuss et al. |

(Continued)

*Primary Examiner* — Edward Urban
*Assistant Examiner* — Ralph H Justus
(74) *Attorney, Agent, or Firm* — Harness, Dickey & Pierce, PLC

(57) ABSTRACT

A mobile system includes an electronic device and a flip cover device. The electronic device communicates with an external device through a near field communication (NFC) scheme. The flip cover device includes a back side cover, which is installed on a back surface of the electronic device to surround the back surface of the electronic device, a front side cover, which selectively covers a front surface of the electronic device and includes a display module, and a connector device, which connects the back side cover and the front side cover. The flip cover device receives power and information data from the electronic device through a first electromagnetic wave emitted from the electronic device and displays the information data on the display module using the power.

19 Claims, 17 Drawing Sheets

(56) References Cited

U.S. PATENT DOCUMENTS

| | | | |
|---|---|---|---|
| 8,971,799 B2* | 3/2015 | Hamada | H02J 7/025 455/41.1 |
| 9,153,089 B1* | 10/2015 | Hewett | G06Q 10/087 |
| 9,288,304 B2* | 3/2016 | Lin | H04B 1/3888 |
| 2006/0183462 A1* | 8/2006 | Kolehmainen | H04B 5/00 455/411 |
| 2008/0195788 A1 | 8/2008 | Tamir et al. | |
| 2010/0057969 A1 | 3/2010 | Meiri et al. | |
| 2010/0099354 A1 | 4/2010 | Johnson | |
| 2010/0279606 A1* | 11/2010 | Hiilan | H04B 5/00 455/41.1 |
| 2011/0127954 A1 | 6/2011 | Walley et al. | |
| 2013/0057079 A1 | 3/2013 | Park et al. | |
| 2014/0198070 A1* | 7/2014 | Won | G06F 3/017 345/173 |
| 2014/0274215 A1* | 9/2014 | Del Toro | G06F 1/1628 455/566 |
| 2014/0285033 A1* | 9/2014 | Jantunen | H04B 5/0031 307/149 |
| 2015/0006343 A1* | 1/2015 | Sako | B60L 11/1818 705/34 |
| 2015/0200716 A1 | 7/2015 | Miyabayashi et al. | |
| 2015/0201389 A1 | 7/2015 | Linsky et al. | |
| 2015/0207357 A1 | 7/2015 | Youm et al. | |
| 2015/0288421 A1* | 10/2015 | Nambord | G06F 1/1632 455/41.1 |
| 2016/0043775 A1* | 2/2016 | Ravani | G06K 19/0727 455/41.1 |
| 2016/0182115 A1* | 6/2016 | Chen | H04B 1/3888 455/575.8 |
| 2016/0277053 A1* | 9/2016 | Wong Chee | H04B 1/3888 |

* cited by examiner

ELECTRONIC DEVICE INCLUDING NEAR FIELD COMMUNICATION DEVICE AND MOBILE SYSTEM HAVING THE SAME

CROSS-REFERENCE TO RELATED APPLICATION(S)

This application claims priority under 35 USC § 119 to Korean Patent Application No. 10-2015-0153219, filed on Nov. 2, 2015 in the Korean Intellectual Property Office (KIPO), the contents of which are herein incorporated by reference in their entirety.

BACKGROUND

1. Technical Field

Example embodiments relate to wireless communication, and more particularly to electronic devices that include a near field communication (NFC) devices.

2. Description of the Related Art

As mobile electronic devices, including smart phones, are widely used, various kinds of subsidiary products for mobile electronic devices have been developed.

For example, flip cover devices that selectively cove front surfaces of mobile electronic devices to protect the mobile electronic devices, have been developed.

SUMMARY

Some example embodiments are directed to provide a mobile electronic device that controls an operation of a flip cover device through a near field communication (NFC) scheme.

Some example embodiments are directed to provide a mobile system that includes a flip cover device and a mobile electronic device.

Some example embodiments are directed to provide a flip cover device.

Some example embodiments are directed to provide a method of operating the mobile system.

According to some example embodiments, a mobile system may include an electronic device and a flip cover device. The electronic device may be configured to communicate with an external device through a near field communication (NFC) scheme. The flip cover device may be configured to receive electrical power and information data from the electronic device through a first electromagnetic wave emitted from the electronic device. The flip cover device may be further configured to display the information data received from the electronic device based on the received electrical power. The flip cover device may include a back side cover, which is installed on a back surface of the electronic device to surround the back surface of the electronic device, a front side cover, which selectively covers a front surface of the electronic device and includes a display module, the flip cover device being configured to display the information data on the display module, and a connector device that connects the back side cover to the front side cover.

A frequency of the first electromagnetic wave may correspond to approximately 13.56 MHz.

The flip cover device may be configured to receive the power and the information data from the electronic device through the first electromagnetic wave based on the flip cover device being in a closed state, such that the front side cover of the flip cover device covers a front surface of the electronic device. The electronic device may be configured to inhibit emission of the first electromagnetic wave based on the flip cover device being in an open state, such that the front surface of the electronic device is exposed to an exterior environment.

The electronic device may be configured to periodically inhibit emission of the first electromagnetic wave and detect whether at least one external NFC reader is near the electronic device, based on the flip cover device being in the closed state. The electronic device may be configured to, in response to detecting at least one external NFC reader near the electronic device, inhibit emission of the first electromagnetic wave and initiate communication with the external NFC reader.

The electronic device may include a sensor configured to generate a state signal representing whether the flip cover device is in a closed state or in an open state, and an application processor. The application processor may be configured to activate a cover enable signal and to output the information data based on a determination that the flip cover device is in the closed state, and selectively deactivate the cover enable signal based on whether the state signal represents that the flip cover device is in the open state. The electronic device may include an NFC device configured to switch to a wireless power transmission mode to emit the first electromagnetic wave corresponding to the information data based on the cover enable signal being activated, and finish emitting the first electromagnetic wave and switch to an NFC controller interface (NCI) mode to perform an operation defined in an NCI standard, based on the cover enable signal being deactivated.

The application processor may be configured to transmit the cover enable signal through a general purpose input output (GPIO) pin. The NFC device may be configured to receive the cover enable signal through the general purpose input output (GPIO) pin.

The NFC device may be configured to selectively enter an activated state and enter the wireless power transmission mode to emit the first electromagnetic wave independently of performing an initialization operation defined in the NCI standard, based on the application processor activating the cover enable signal while the NFC device is deactivated.

The NFC device may be configured to inhibit emission of the first electromagnetic wave and enter a deactivated state, based on the application processor deactivating the cover enable signal.

The NFC device may be configured to, based on the application processor activating the cover enable signal while the NFC device is in an activated state, back up a current state without changing a state on a radio frequency (RF) communication state machine defined in the NCI standard and enter in the wireless power transmission mode to emit the first electromagnetic wave.

The NFC device may be configured to inhibit emission of the first electromagnetic wave and switch to the NCI mode to restore the backed up state, based on the application processor deactivating the cover enable signal.

The NFC device may be configured to, in the wireless power transmission mode, emit the first electromagnetic wave to the flip cover device during a first time period, and inhibit emission of the first electromagnetic wave, during a second time period, to detect whether an external NFC reader is near the electronic device.

The NFC device may be configured to, during the second time period, measure a magnitude of an antenna voltage generated based on a second electromagnetic wave received from an exterior environment, and determine that the external NFC reader is detected near the electronic device based on the magnitude of the antenna voltage being greater than a reference magnitude.

The NFC device may be configured to, based on detecting the external NFC reader near the electronic device while the NFC device is in the wireless power transmission mode, inhibit emission of the first electromagnetic wave, transmit a reader detection signal to the application processor, and switch to the NCI mode.

The application processor may be configured to communicate with the external NFC reader using the NFC device, based on receiving the reader detection signal from the NFC device.

The application processor may be configured to perform an electronic payment, based on transmitting payment information to the external NFC reader using the NFC device, based on a determination that the external NFC reader corresponds to an NFC payment terminal.

The application processor may be configured to deactivate the cover enable signal after an elapse of an information display time period, the information display time period initiating at a time at which the application processor activates the cover enable signal.

The flip cover device may include a resonance circuit configured to generate an antenna voltage based on the first electromagnetic wave received from the electronic device; and a control chip. The control chip may be configured to generate an internal operation voltage based on the antenna voltage, obtain the information data based on demodulating the antenna voltage, and provide the information data to the display module.

The flip cover device may include at least one contact area configured to contact the electronic device, and the at least one contact area exclusively includes one or more electric insulation materials.

According to some example embodiments, a mobile electronic device may include a sensor, an application processor, and an NFC device. The sensor may be configured to generate a state signal representing whether a flip cover device is in a closed state or in an open state, such that the flip cover device covers or exposes a front surface of the mobile electronic device, respectively. The application processor may be configured to activate a cover enable signal and to output information data based on a determination that the flip cover device is in the closed state, and selectively deactivate the cover enable signal based on whether the state signal represents that the flip cover device is in the open state. The NFC device may be configured to switch to a wireless power transmission mode to emit a first electromagnetic wave corresponding to the information data when the cover enable signal is activated, and inhibit emission of the first electromagnetic wave and to switch to an NFC controller interface (NCI) mode to perform an operation defined in an NCI standard, based on the cover enable signal being deactivated.

According to some example embodiments, a method of operating a mobile system including an electronic device and a flip cover device may include determining, at an electronic device, whether a flip cover device is in a closed state or in an open state, such that the flip cover device is covering or exposing the front surface of the electronic device, respectively; switching, at the electronic device, to a wireless power transmission mode to emit a first electromagnetic wave corresponding to information data, if the flip cover device is determined to be in the closed state; receiving, at the flip cover device, electrical power and the information data from the electronic device through the first electromagnetic wave; displaying, at the flip cover device, the information data on the display module using the received electrical power; and switching, at the electronic device, to an NFC controller interface (NCI) mode, such that the electronic device performs an operation defined in an NCI standard, after the electronic device inhibits emission of the first electromagnetic wave, if the flip cover device is determined to be in the open state. The electronic device may be configured to communicate with an external device through an NFC scheme. The flip cover device may be configured to selectively cover a front surface of the electronic device, the flip cover device including a display module.

The switching, at the electronic device, to the wireless power transmission mode to emit the first electromagnetic wave corresponding to the information data may include activating, at an application processor included in the electronic device, a cover enable signal based on the flip cover device being in the closed state; operating an NFC device included in the electronic device to operate in the wireless power transmission mode to emit the first electromagnetic wave, independently of performing an initialization operation defined in the NCI standard after the NFC device is turned on, based on the cover enable signal being activated while the NFC device is in a deactivated state; and enter in the wireless power transmission mode to emit the first electromagnetic wave after backing up a current state, independently of changing a state on a radio frequency (RF) communication state machine defined in the NCI standard, based on the cover enable signal being activated while the NFC device is in an activated state.

The application processor may be configured to transmit the cover enable signal through a general purpose input output (GPIO) pin, and the NFC device may be configured to receive the cover enable signal through the general purpose input output (GPIO) pin.

The switching, at the electronic device, to the wireless power transmission mode to emit the first electromagnetic wave corresponding to the information data may include emitting the first electromagnetic wave to the flip cover device during a first time period, and stopping emitting the first electromagnetic wave to detect whether an external NFC reader is near the electronic device during a second time period, based on the NFC device entering in the wireless power transmission mode, based on the cover enable signal being activated while the NFC device is in on the activated state; switching the NFC device to the NCI mode to restore the backed up state after finishing emitting the first electromagnetic wave and transmitting a reader detection signal to the application processor, based on NFC device detecting the external NFC reader near the electronic device; and communicating with the external NFC reader using the NFC device, based on the reader detection signal.

A frequency of the first electromagnetic wave may correspond to approximately 13.56 MHz.

According to some example embodiments, an apparatus may include a flip cover device configured to at least partially enclose an electronic device. The flip cover device may include a back side cover configured to surround a back surface of the electronic device, a front side cover configured to selectively cover or expose a front surface of the electronic device, the front side cover including a display module, the flip cover device, and a connector device that connects the back side cover to the front side cover. The flip cover device may be further configured to receive electrical power and information data from the electronic device through a first electromagnetic wave received from the electronic device according to a near field communication (NFC) scheme. The flip cover device may be further configured to display the received information data on the display module using the received electrical power.

The flip cover device may be configured to selectively receive the power and the information data from the electronic device based on the front side cover covering the front surface of the electronic device.

The flip cover device may include a resonance circuit configured to generate an antenna voltage based on the first electromagnetic wave received from the electronic device; and a control chip. The control chip may be configured to generate an internal operation voltage based on the antenna voltage, obtain the information data based on demodulating the antenna voltage, and provide the information data to the display module.

The flip cover device may include at least one contact area configured to contact the electronic device, and the at least one contact area exclusively includes one or more electric insulation materials.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION OF THE EMBODIMENTS

Figure 1:
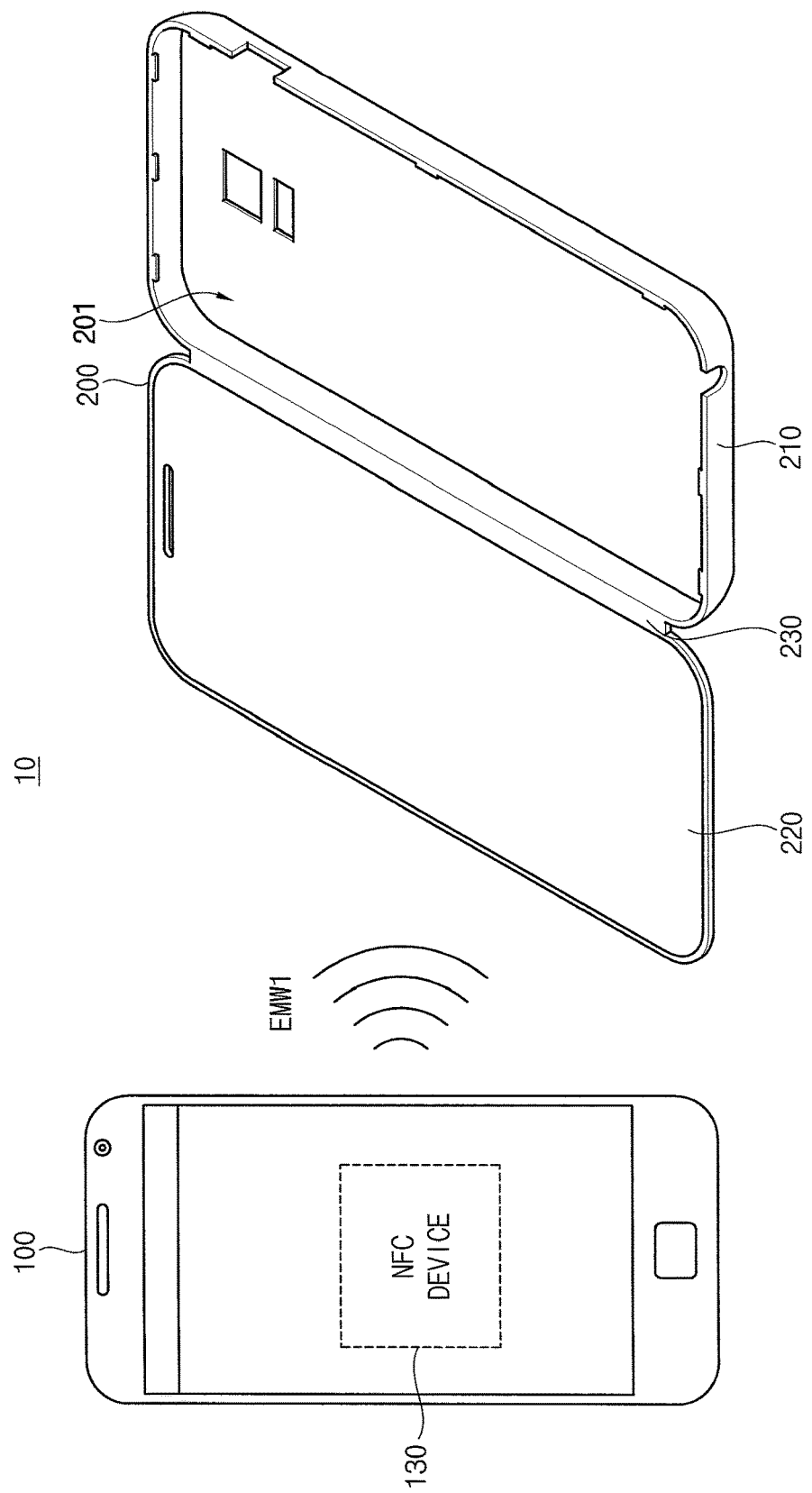
FIG. 1, FIG. 2, FIG. 3, FIG. 4, and FIG. 5 are diagrams illustrating a mobile system according to some example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1, FIG. 2, FIG. 3, FIG. 4, and FIG. 5 are diagrams illustrating a mobile system according to some example embodiments.

Referring to FIG. 1, FIG. 2, FIG. 3, FIG. 4, and FIG. 5, a mobile system 10 includes an electronic device 100 and a flip cover device 200.

The electronic device 100 includes a near field communication (NFC) device 130. Therefore, the electronic device 100 may communicate with an external device through a NFC scheme using the NFC device 130.

In FIGS. 1 to 5, the electronic device 100 is illustrated to be a smart phone. However, example embodiments are not limited thereto. According to some example embodiments, the electronic device 100 may be any mobile device, such as a cellular phone, a smart phone, a tablet computer, a wearable device, a smart watch, smart glasses, a laptop computer, a personal digital assistant (PDA), a portable multimedia player (PMP), a digital camera, a music player, a portable game console, a navigation device, etc.

The flip cover device 200 includes a back side cover 210, a front side cover 220, and a connector device 230.

The back side cover 210 may be installed on a back surface of the electronic device 100 to surround the back surface of the electronic device 100. In some example embodiments, a battery cover of the electronic device 100 may be detached from the electronic device 100, and then the back side cover 210 may be installed on a location where the battery cover is installed. In other example embodiments, the back side cover 210 may be installed on the back surface of the electronic device 100 to surround the battery cover of the electronic device 100 while the battery cover is installed on the electronic device 100.

FIG. 1 illustrates the mobile system 10 when the flip cover device 200 is detached from the electronic device 100, and FIGS. 2 to 5 illustrate the mobile system 10 when the flip cover device 200 is installed on the electronic device 100, such that the flip cover device 200 at least partially encloses the electronic device 100.

The front side cover 220 may selectively cover a front surface 100a of the electronic device 100.

The connector device 230 may connect the back side cover 210 and the front side cover 220.

At least one of the front side cover 220 and the back side cover 210 may at least partially define an enclosure 201 in which the electronic device 100 may be enclosed. In the example embodiments illustrated in FIGS. 1-5, for example, the back side cover at least partially defines side and bottom boundaries of an enclosure 201 in which the electronic device 100 may be installed to be at least partially enclosed by the flip cover device 200. If and/or when the back side cover 210 is installed (e.g., coupled) to the back surface of the electronic device 100, as shown in at least FIG. 2, the electronic device 100 may be at least partially enclosed in the enclosure 201 that is at least partially defined by the back side cover 210.

As shown in FIGS. 1-5, the front side cover 220 may define a top boundary of the enclosure 201 if and/or when the front side cover 220 is moved to a closed position, such that the front side cover 220 covers a front surface of the electronic device 100 and the flip cover device 200 is in a closed state.

In some example embodiments, the front side cover 220 may at least partially define top and side boundaries of enclosure 201, and the electronic device 100 may be coupled to the front side cover 220 to install the electronic device 100 in enclosure 201.

Figure 2:
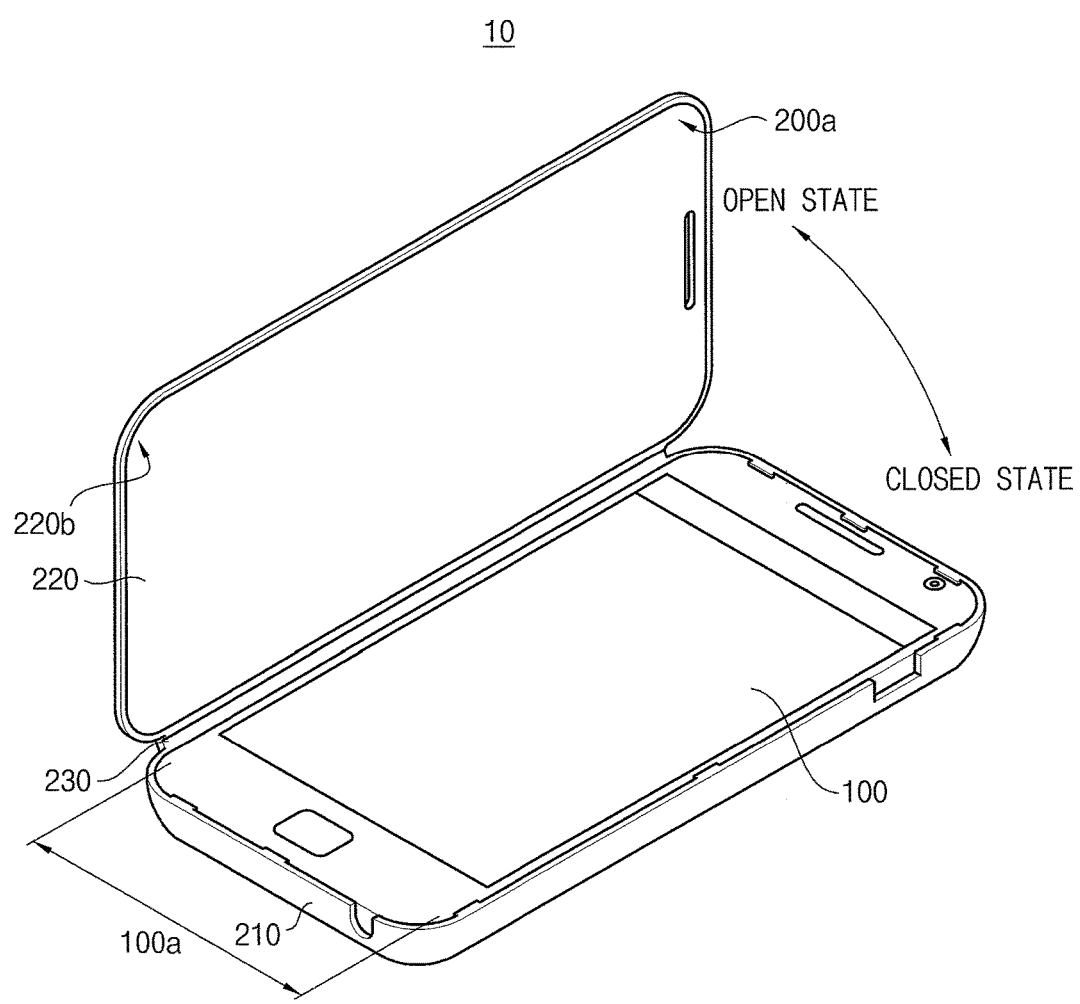

In some example embodiments, the connector device 230 may include a foldable material. For example, as illustrated in FIG. 2, if and/or when the connector device 230 is folded while the back side cover 210 is installed on the back surface of the electronic device 100, the flip cover device 200 may be in a closed state such that the front side cover 220 may cover the front surface 100a of the electronic device 100. Alternately, when the connector device 230 is unfolded while the back side cover 210 is installed on the back surface of the electronic device 100, the flip cover device 200 may be in an open state such that the front side cover 220 may open ("expose") the front surface 100a of the electronic device 100 to an exterior environment.

Figure 3:
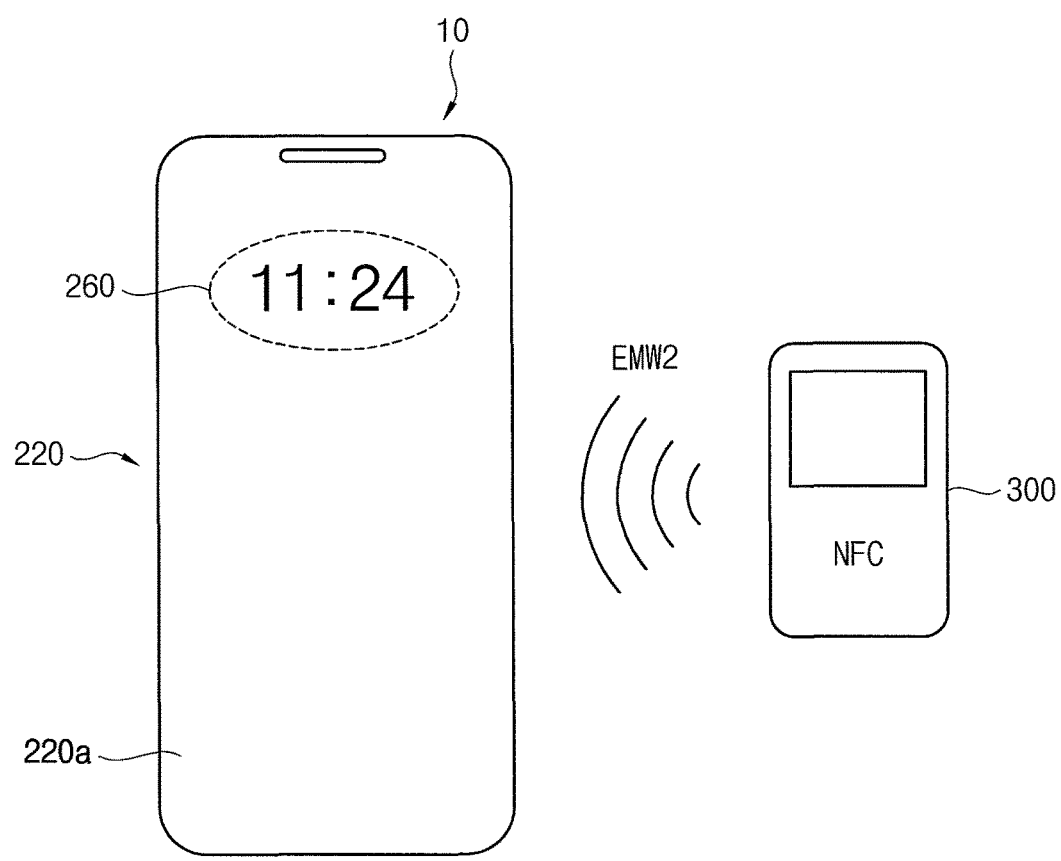
Figure 4:
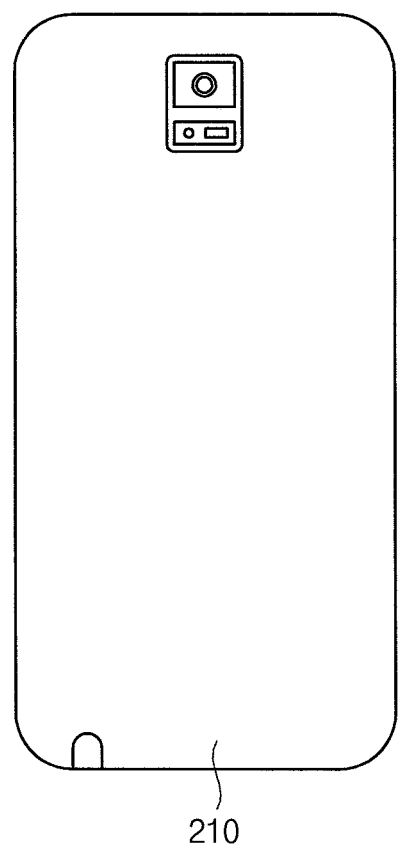
Figure 5:
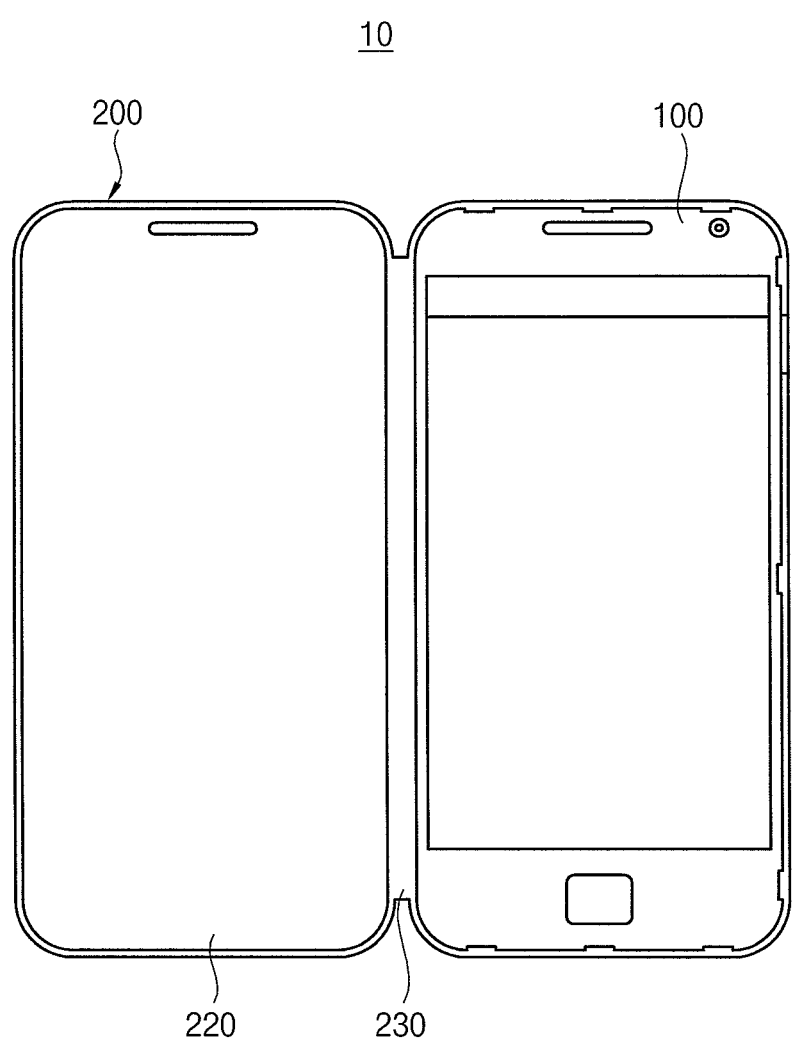

FIG. 3 illustrates a front view of the mobile system 10 when the flip cover device 200 is in the closed state while the back side cover 210 is installed on the back surface of the electronic device 100, FIG. 4 illustrates a bottom view of the mobile system 10 when the flip cover device 200 is in the closed state while the back side cover 210 is installed on the back surface of the electronic device 100, and FIG. 5 illustrates the front view of the mobile system 10 when the flip cover device 200 is in the open state while the back side cover 210 is installed on the back surface of the electronic device 100.

In some example embodiments, contact areas 200a of the flip cover device 200 contacting with the electronic device 100 (e.g., contacting the front surface 100a) while the flip cover device 200 is installed on the electronic device 100 may include only electric insulation materials. Therefore, the flip cover device 200 may not be electrically connected to the electronic device 100 through an electric wiring.

As illustrated in FIG. 3, the flip cover device 200 may include a display module 260 disposed in an outer surface 220a of the front side cover 220. The outer surface 220a may be an opposite surface of the front side cover 220, relative to another surface that is configured to contact the front surface 100a of the electronic device if and/or when the flip cover device 200 is in a closed state. In some example embodiments, the display module 260 may be disposed between an inner surface 220b of the front side cover 220 and an outer surface 220a of the front side cover 220. Therefore, the display module 260 may not be exposed to an outside, and may display information by emitting a light signal through the outer surface of the front side cover 220 when turned on.

If and/or when the flip cover device 200 is installed on the electronic device 100, the electronic device 100 may emit a first electromagnetic wave EMW1 corresponding to information data, which may be displayed on the display module 260, using the NFC device 130. The information data may include information associated with the electronic device 100. For example, the information data may include a current time, a remaining battery level associated with the electronic device 100, a volume level of a sound associated with the electronic device 100, etc.

In some example embodiments, a frequency of the first electromagnetic wave EMW1 may be about ("approximately") 13.56 MHz, which corresponds to a carrier frequency defined in an NFC standard.

The flip cover device 200 may be configured to receive power and the information data from the electronic device 100 through the first electromagnetic wave EMW1 emitted from the electronic device 100.

In some example embodiments, the flip cover device 200 may be configured to generate an internal operation voltage using the first electromagnetic wave EMW1 received from the electronic device 100, and operate using the internal operation voltage as a power source.

The flip cover device 200 may be configured to obtain the information data by demodulating the first electromagnetic wave EMW1, and provide the information data to the display module 260 to display the information data on the display module 260.

In some example embodiments, the electronic device 100 may be configured to determine whether the flip cover device 200 is in the closed state or in the open state. For example, the flip cover device 200 may include a magnetic material inside the front side cover 220, and the electronic device 100 may include a magnetic sensor for detecting a density of a magnetic flux. In this case, the electronic device 100 may determine that the flip cover device 200 is in the closed state when a density of a magnetic flux detected by the magnetic sensor is equal to or greater than a reference density. Alternately, the electronic device 100 may determine that the flip cover device 200 is in the open state when a density of a magnetic flux detected by the magnetic sensor is smaller than the reference density.

If and/or when the flip cover device 200 is in the closed state, the electronic device 100 may provide the power and the information data to the flip cover device 200 by emitting the first electromagnetic wave EMW1, and the flip cover device 200 may display the information data on the display module 260 using the power received from the electronic device 100 through the first electromagnetic wave EMW1.

If and/or when the flip cover device 200 is in the open state, the electronic device 100 may stop emitting the first electromagnetic wave EMW1 (e.g., inhibit emission of the first electromagnetic wave EMW1). In this case, the display module 260 included in the flip cover device 200 may be turned off.

In some example embodiments, while the flip cover device 200 is in the closed state, the electronic device 100 may periodically stop emitting (e.g., inhibit emission of) the first electromagnetic wave EMW1 to detect whether an external NFC reader 300 is near the electronic device 100.

For example, as illustrated in FIG. 3, the electronic device 100 may periodically stop emitting the first electromagnetic wave EMW1 and measure a magnitude of a second electromagnetic wave EMW2 received from outside the mobile system 10 (e.g., an exterior environment). If and/or when the magnitude of the second electromagnetic wave EMW2 received from outside is greater than a reference magnitude, the electronic device 100 may determine that the external NFC reader 300 is detected near the electronic device 100.

When the electronic device 100 detects the external NFC reader 300 near the electronic device 100, the electronic device 100 may immediately finish emitting (e.g., stop emitting, inhibit emission of, etc.) the first electromagnetic wave EMW1 and communicate with the external NFC reader 300 through (according to) a NFC scheme.

A time period during which the electronic device 100 stops emitting the first electromagnetic wave EMW1 and detects whether an external NFC reader 300 is near the electronic device 100 may be much smaller than a time period during which the electronic device 100 emits the first electromagnetic wave EMW1. If and/or when the display module 260 includes a capacitor storing power, the display module 260 may not be turned off and be maintained in a turned on state although the first electromagnetic wave EMW1 is not received for a short time.

As described above, while the electronic device 100 provides the information data to the flip cover device 200 by emitting the first electromagnetic wave EMW1, the electronic device 100 may periodically detect whether an external NFC reader 300 is near the electronic device 100. In addition, when the electronic device 100 detects an external NFC reader 300 near the electronic device 100, the electronic device 100 may immediately finish emitting the first electromagnetic wave EMW1 and communicate with the external NFC reader 300 through a NFC scheme. Therefore, the mobile system 10 according to some example embodiments may effectively display the information data on the flip cover device 200 through NFC without degrading an NFC performance.

Figure 6:
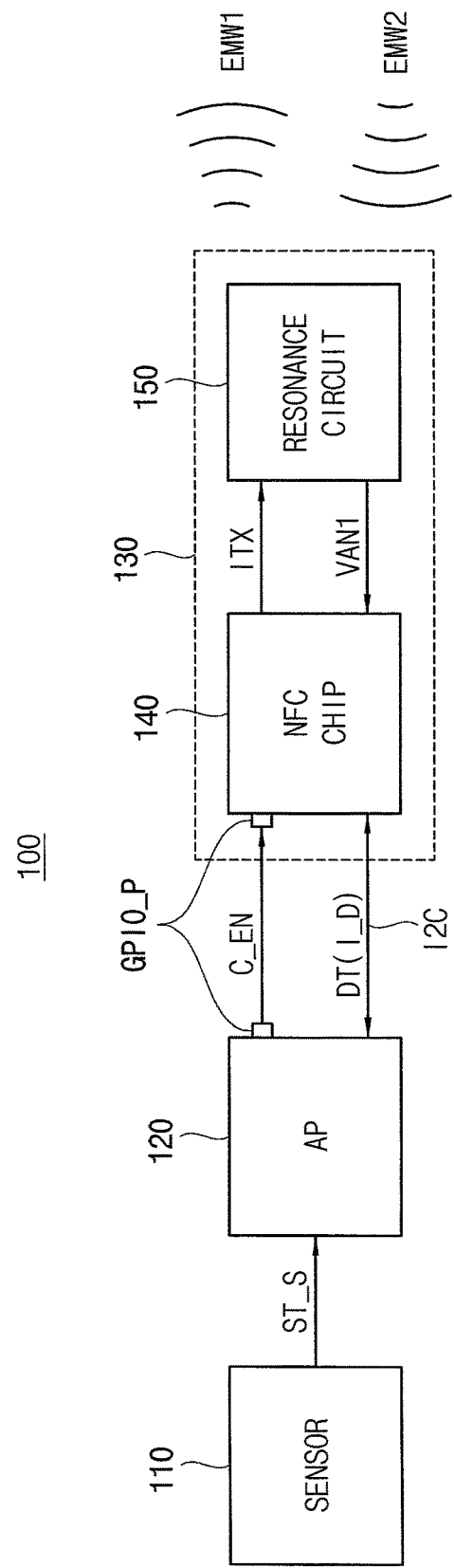
FIG. 6 is a block diagram illustrating an electronic device included in the mobile system of FIG. 1 according to some example embodiments.

FIG. 6 is a block diagram illustrating an example of an electronic device 100 included in the mobile system 10 of FIG. 1.

Referring to FIG. 6, the electronic device 100 may include a sensor 110, an application processor AP 120, and the NFC device 130.

The application processor 120 may include a memory. The memory may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM). The memory may store computer-readable instructions.

The application processor 120 may include a processor. The processor may be a central processing unit (CPU), a controller, or an application-specific integrated circuit (ASIC), that when, executing computer-readable instructions stored in a memory, configures the processor as a special purpose computer to perform the operations of the application processor 120.

The application processor 120 may communicate with an external device using the NFC device 130.

For example, the application processor 120 may transceive (e.g., transmit and receive) commands and data with the NFC device 130 according to an NFC controller interface (NCI) standard defined by an NFC forum to control the NFC device 130 such that the application processor 120 may communicate with an external device using the NFC device 130.

In some example embodiments, the NFC device 130 may include an NFC chip 140 and a resonance circuit 150.

When the application processor 120 communicates with an external device using the NFC device 130, the application processor 120 may provide data DT to the NFC chip 140, the NFC chip 140 may generate an output current ITX corresponding to the data DT by modulating the data DT using a carrier signal, and the resonance circuit 150 may emit the first electromagnetic wave EMW1 based on the output current ITX. In addition, the resonance circuit 150 may generate an antenna voltage VAN1 based on the second electromagnetic wave EMW2 received from the external device, and the NFC chip 140 may generate data DT by demodulating the antenna voltage VAN1 and provide the data DT to the application processor 120.

In some example embodiments, the application processor 120 and the NFC chip 140 may transceive (e.g., transmit and receive) the data DT through an inter-integrated circuit (I2C) bus.

In addition, the application processor 120 may be coupled to the NFC chip 140 through a general purpose input output (GPIO) pin GPIO_P. As will be described later, the application processor 120 may provide a cover enable signal C_EN to the NFC chip 140 through the GPIO pin GPIO_P.

The sensor 110 may detect whether the flip cover device 200 is in the closed state or in the open state, and generate a state signal ST_S representing whether the flip cover device 200 is in the closed state or in the open state. For example, the sensor 110 may generate the state signal ST_S having a first logic level when the flip cover device 200 is in the closed state, and generate the state signal ST_S having a second logic level when the flip cover device 200 is in the open state. In some example embodiments, the first logic level may be a logic high level, and the second logic level may be a logic low level. In other example embodiments, the first logic level may be a logic low level, and the second logic level may be a logic high level.

In some example embodiments, when the flip cover device 200 includes a magnetic material inside the front side cover 220, the sensor 110 may include a magnetic sensor for detecting a magnetic flux. In this case, when a density of a detected magnetic flux is equal to or greater than the reference density, the sensor 110 may determine that the flip cover device 200 is in the closed state and generate the state signal ST_S having the first logic level. Alternately, when a density of a detected magnetic flux is smaller than the reference density, the sensor 110 may determine that the flip cover device 200 is in the open state and generate the state signal ST_S having the second logic level.

The application processor 120 may receive the state signal ST_S from the sensor 110.

When the state signal ST_S transitions to the first logic level representing the closed state, the application processor 120 may activate the cover enable signal C_EN by transitioning a voltage of the GPIO pin GPIO_P to the logic high level, and output the information data I_D, which is to be displayed on the display module 260 of the flip cover device 200, through the I2C bus.

When the cover enable signal C_EN, which is provided through the GPIO pin GPIO_P, is activated, an interrupt may occur in the NFC chip 140 such that the NFC chip 140 may switch from an NCI mode, in which the NFC chip 140 performs an operation defined in the NCI standard, to a wireless power transmission mode, in which the NFC chip 140 provides the power and the information data I_D to the flip cover device 200. In some example embodiments, when the NFC chip 140 receives the activated cover enable signal C_EN, the NFC chip 140 may back up a current state in the NCI mode, and then switch to the wireless power transmission mode.

In the wireless power transmission mode, the NFC chip 140 may generate the output current ITX corresponding to the information data I_D received from the application processor 120, and the resonance circuit 150 may emit the first electromagnetic wave EMW1 based on the output current ITX. Therefore, the flip cover device 200 may obtain the information data I_D by demodulating the first electromagnetic wave EMW1, and display the information data I_D on the display module 260.

When the state signal ST_S transitions to the second logic level representing the open state, the application processor 120 may deactivate the cover enable signal C_EN by transitioning the voltage of the GPIO pin GPIO_P to the logic low level.

When the cover enable signal C_EN, which is provided through the GPIO pin GPIO_P, is deactivated, the NFC chip 140 may finish emitting the first electromagnetic wave EMW1 and switch to the NCI mode. Therefore, the display module 260 included in the flip cover device 200 may be turned off. In some example embodiments, when the NFC chip 140 switches from the wireless power transmission mode to the NCI mode, the NFC chip 140 may restore the backed up state and restart the operation defined in the NCI standard.

In some example embodiments, when the flip cover device 200 maintains in the closed state during an information display time period after the flip cover device 200 switches from the open state to the closed state, the electronic device 100 may turn off the display module 260 included in the flip cover device 200 to reduce a battery consumption.

For example, when the state signal ST_S is maintained in the first logic level during the information display time period after the application processor 120 activates the cover enable signal C_EN by transitioning the voltage of the GPIO pin GPIO_P to the logic high level, the application processor 120 may deactivate the cover enable signal C_EN by transitioning the voltage of the GPIO pin GPIO_P to the logic low level after the information display time period from a time at which the application processor 120 activates the cover enable signal C_EN. When the NFC chip 140 receives the deactivated cover enable signal C_EN, the NFC chip 140 may finish emitting the first electromagnetic wave EMW1 and switch to the NCI mode. Therefore, the display module 260 included in the flip cover device 200 may be turned off.

Figure 7:
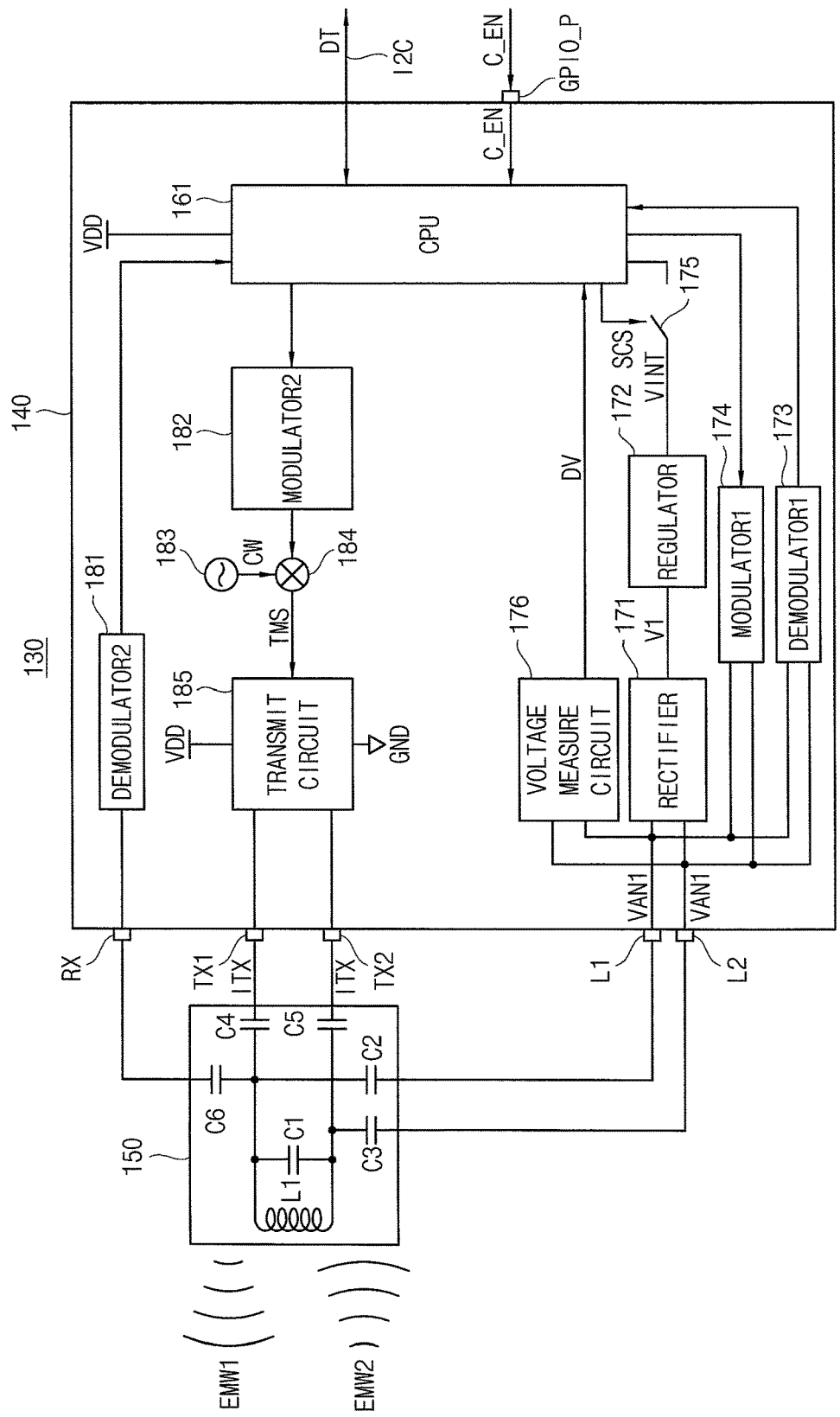
FIG. 7 is a block diagram illustrating a near field communication (NFC) device included in the electronic device of FIG. 6 according to some example embodiments.

FIG. 7 is a block diagram illustrating an example of a near field communication (NFC) device included in the electronic device of FIG. 6.

Referring to FIG. 7, the NFC device 130 may include the NFC chip 140 and the resonance circuit 150.

The NFC chip 140 may be connected to the resonance circuit 150 through a first power electrode L1, a second power electrode L2, a first transmission electrode TX1, a second transmission electrode TX2, and a reception electrode RX.

The resonance circuit 150 may include an antenna L1 and first through sixth capacitors C1~C6.

The antennal L1 and the first capacitor C1 may be coupled in parallel to form a resonance frequency. For example, the resonance frequency formed by the antennal L1 and the first capacitor C1 may be about 13.56 MHz, which corresponds to a carrier frequency defined in the NFC standard. The second capacitor C2 may be coupled between the antenna L1 and the first power electrode L1, and the third capacitor C3 may be coupled between the antenna L1 and the second power electrode L2. The fourth capacitor C4 may be coupled between the antenna L1 and the first transmission electrode TX1, and the fifth capacitor C5 may be coupled between the antenna L1 and the second transmission electrode TX2. The sixth capacitor C6 may be coupled between the antenna L1 and the reception electrode RX.

When the resonance circuit 150 receives the second electromagnetic wave EMW2, which has a frequency corresponding to the resonance frequency of the resonance circuit 150, from an external NFC reader, a mutual induction may occur between the resonance circuit 150 and the external NFC reader. Therefore, an induced voltage may be generated at terminals of the antenna L1.

The induced voltage generated at the terminals of the antenna L1 may be provided to the first power electrode L1 and the second power electrode L2 through the second capacitor C2 and the third capacitor C3, respectively, as the antenna voltage VAN1.

When the resonance circuit 150 receives the output current ITX from the NFC chip 140 through the first transmission electrode TX1 and the second transmission electrode TX2, the resonance circuit 150 may emit the first electromagnetic wave EMW1 corresponding to the output current ITX.

A structure of the resonance circuit 150 illustrated in FIG. 7 is only an example. According to some example embodiments, the resonance circuit 150 may be implemented in various structures.

The NFC chip 140 may include a central processing unit (CPU) 161, a rectifier 171, a regulator 172, a first demodulator 173, a first modulator 174, a power switch 175, a voltage measure circuit 176, a second demodulator 181, a second modulator 182, an oscillator 183, a mixer 184, and a transmit circuit 185.

The CPU 161 may receive the cover enable signal C_EN from the application processor 120 through the GPIO pin GPIO_P, and receive the data DT from the application processor 120 through the I2C bus. The CPU 161 may control the overall operation of the NFC chip 140 under a control of the application processor 120.

When the NFC chip 140 is turned on while the cover enable signal C_EN is in a deactivated state, the CPU 161 may enter in the NCI mode and perform an initialization operation by performing a handshaking process with the application processor 120 according to the NCI standard. The CPU 161 may receive various parameters, which are required for communicating with an external device, from the application processor 120 through the initialization operation, and internally store the parameters.

After finishing the initialization operation, the NFC chip 140 may operate based on the parameters on a radio frequency (RF) communication state machine defined in the NCI standard.

Figure 8:
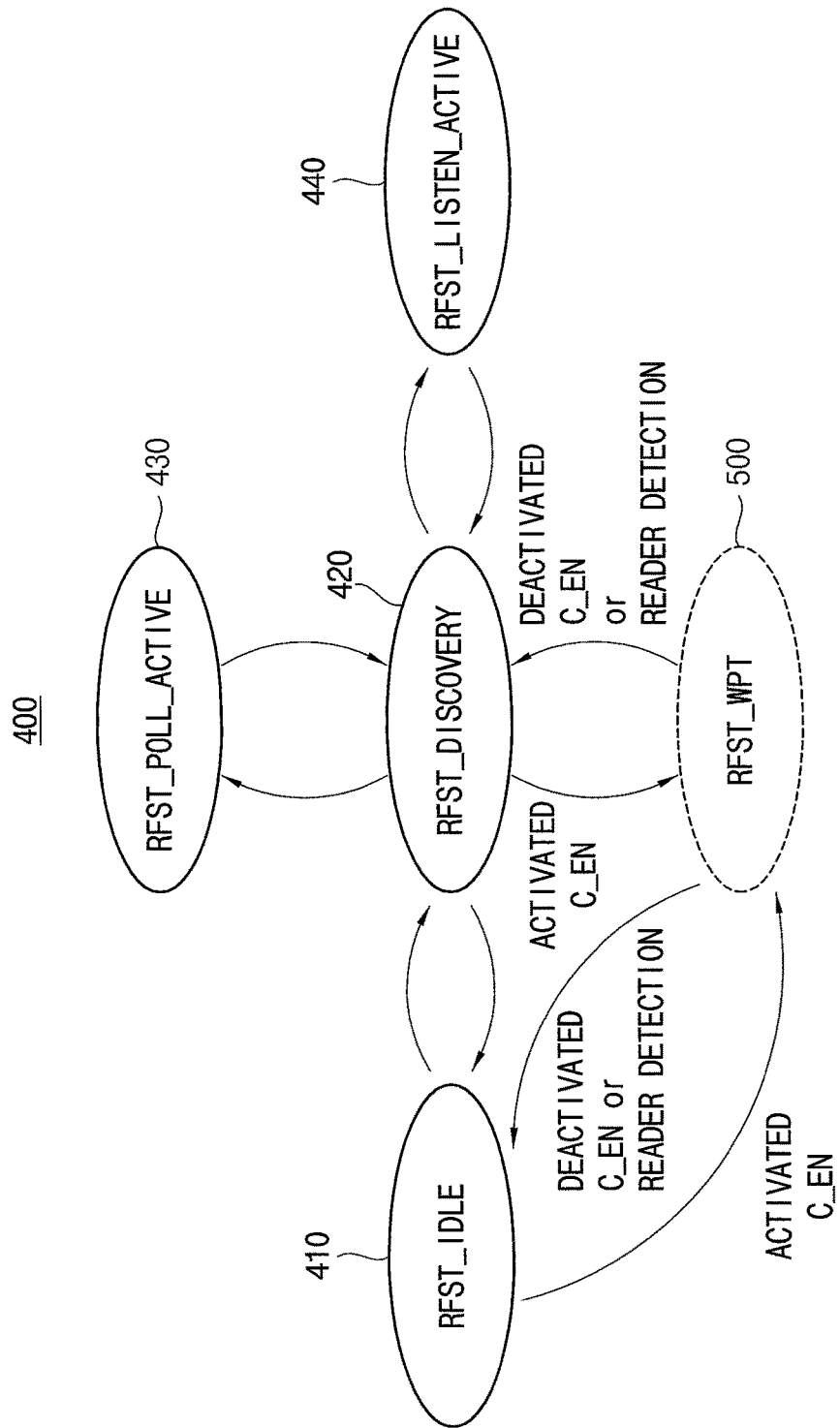
FIG. 8 is a diagram illustrating a radio frequency (RF) communication state machine defined in an NCI standard according to some example embodiments.

FIG. 8 is a diagram illustrating a radio frequency (RF) communication state machine defined in an NCI standard.

For ease of explanation, a simplified version of the RF communication state machine is illustrated in FIG. 8.

In FIG. 8, an idle state RFST_IDLE 410, a discovery state RFST_DISCOVERY 420, a poll active state RFST_POLL_ACTIVE 430, and a listen active state RFST_LISTEN_ACTIVE 440 included in the RF communication state machine 400 may corresponds to states defined in the NCI standard, and a wireless power transmission state RFST_WPT 500 included in the RF communication state machine 400 may corresponds to a state which is newly added in some example embodiments. The wireless power transmission state RFST_WPT 500 may be entered in response to the interrupt occurred in the NFC chip 140 by the cover enable signal C_EN, which is provided through the GPIO pin GPIO_P.

Referring to FIGS. 7 and 8, after performing the initialization operation, the NFC chip 140 may enter in the idle state RFST_IDLE 410.

In the idle state RFST_IDLE 410, the NFC chip 140 may receive parameters, which are related with an operation in a poll mode in which the NFC chip 140 detects an external NFC card and an operation in a listen mode in which the NFC chip 140 detects an external NFC reader, from the application processor 120.

After that, the NFC chip 140 may enter in the discovery state RFST_DISCOVERY 420 and alternately operate in the poll mode and in the listen mode.

When the NFC chip 140 detects an external NFC card in the poll mode, the NFC chip 140 may enter in the poll active state RFST_POLL_ACTIVE 430 and communicate with the external NFC card by emitting an electromagnetic wave to the external NFC card. When the communication with the external NFC card is finished, the NFC chip 140 may return to the discovery state RFST_DISCOVERY 420.

When the NFC chip 140 detects an external NFC reader in the listen mode, the NFC chip 140 may enter in the listen active state RFST_LISTEN_ACTIVE 440 and communicate with the external NFC reader based on an electromagnetic wave emitted from the external NFC reader. When the communication with the external NFC reader is finished, the NFC chip 140 may return to the discovery state RFST_DISCOVERY 420.

Referring again to FIG. 7, the NFC chip 140 may perform a transmit operation and a receive operation through the first power electrode L1 and the second power electrode L2 in the listen active state RFST_LISTEN_ACTIVE 440, perform a transmit operation through the first transmission electrode TX1 and the second transmission electrode TX2 in the poll active state RFST_POLL_ACTIVE 430, and perform a receive operation through the reception electrode RX in the poll active state RFST_POLL_ACTIVE 430.

In the listen active state RFST_LISTEN_ACTIVE 440, the rectifier 171 may generate a first voltage V1, which is a direct voltage, by rectifying the antenna voltage VAN1 provided from the resonance circuit 150 through the first power electrode L1 and the second power electrode L2.

The regulator 172 may generate an internal voltage VINT, which has a voltage level of a desired (and/or alternatively, predetermined) magnitude usable in the NFC chip 140, using the first voltage V1.

The CPU 161 may operate using a supply voltage VDD provided from a power source, such as a battery. In addition, the CPU 161 may receive the internal voltage VINT from the regulator 172 through the power switch 175. When the supply voltage VDD is equal to or higher than a desired (and/or alternatively, predetermined) voltage level, the CPU 161 may operate using the supply voltage VDD and disable a switch control signal SCS to turn off the power switch 175. When the supply voltage VDD is lower than the desired (and/or alternatively, predetermined) voltage level, the CPU 161 may enable the switch control signal SCS to turn on the power switch 175 such that the CPU 161 may operate using the internal voltage VINT provided from the regulator 172.

When the NFC chip 140 performs the receive operation in the listen active state RFST_LISTEN_ACTIVE 440, the first demodulator 173 may generate data DT by demodulating a signal provided from the resonance circuit 150 through the first power electrode L1 and the second power electrode L2, and provide the data DT to the CPU 161. The CPU 161 may provide the data DT to the application processor 120 through the I2C bus.

When the NFC chip 140 performs the transmit operation in the listen active state RFST_LISTEN_ACTIVE 440, the CPU 161 may receive data DT from the application processor 120 through the I2C bus, and provide the data DT to the first modulator 174. The first modulator 174 may modulate the data DT and provide a modulation signal to the first power electrode L1 and the second power electrode L2. For instance, the first modulator 174 may generate the modulation signal by performing a load modulation on the data DT.

When the NFC chip 140 performs the receive operation in the poll active state RFST_POLL_ACTIVE 430, the second demodulator 181 may generate data DT by demodulating a signal provided from the resonance circuit 150 through the reception electrode RX, and provide the data DT to the CPU 161. The CPU 161 may provide the data DT to the application processor 120 through the I2C bus.

When the NFC chip 140 performs the transmit operation in the poll active state RFST_POLL_ACTIVE 430, the CPU 161 may receive data DT from the application processor 120 through the I2C bus, and provide the data DT to the second modulator 182. The second modulator 182 may modulate the data DT to generate a modulation signal, the oscillator 183 may generate a carrier signal CW having a carrier frequency (e.g., 13.56 MHz), and the mixer 184 may generate a transmission modulation signal TMS by synthesizing the carrier signal CW with the modulation signal.

The transmit circuit 185 may be coupled between the supply voltage VDD and a ground voltage GND.

In the poll active state RFST_POLL_ACTIVE 430, the transmit circuit 185 may provide the output current ITX, which corresponds to the transmission modulation signal TMS received from the mixer 184, to the resonance circuit 150 through the first transmission electrode TX1 and the second transmission electrode TX2, and the resonance circuit 150 may emit the first electromagnetic wave EMW1 corresponding to the output current ITX.

In some example embodiments, in the poll active state RFST_POLL_ACTIVE 430, the transmit circuit 185 may provide the output current ITX corresponding to the transmission modulation signal TMS to the resonance circuit 150 through the first transmission electrode TX1 and the second transmission electrode TX2 by connecting the first transmission electrode TX1 and the second transmission electrode TX2 to the supply voltage VDD through a pull-up load or to the ground voltage GND through a pull-down load based on the transmission modulation signal TMS.

For example, the transmit circuit 185 may connect the first transmission electrode TX1 to the supply voltage VDD through the pull-up load and connect the second transmission electrode TX2 to the ground voltage GND through the pull-down load, or connect the first transmission electrode TX1 to the ground voltage GND through the pull-down load and connect the second transmission electrode TX2 to the supply voltage VDD through the pull-up load based on the transmission modulation signal TMS to provide the output current ITX corresponding to the transmission modulation signal TMS to the resonance circuit 150 through the first transmission electrode TX1 and the second transmission electrode TX2.

When the transmit circuit 185 connects the first transmission electrode TX1 to the supply voltage VDD through the pull-up load and connects the second transmission electrode TX2 to the ground voltage GND through the pull-down load, the output current ITX may be generated from the supply voltage VDD, be provided to the resonance circuit 150 through the first transmission electrode TX1 and be sunk to the ground voltage GND through the second transmission electrode TX2.

When the transmit circuit 185 connects the first transmission electrode TX1 to the ground voltage GND through the pull-down load and connects the second transmission electrode TX2 to the supply voltage VDD through the pull-up load, the output current ITX may be generated from the supply voltage VDD, be provided to the resonance circuit 150 through the second transmission electrode TX2 and be sunk to the ground voltage GND through the first transmission electrode TX1.

In the listen active state RFST_LISTEN_ACTIVE 440, the transmit circuit 185 may not provide the output current ITX to the resonance circuit 150 by disconnecting the first transmission electrode TX1 and the second transmission electrode TX2 from the supply voltage VDD and the ground voltage GND.

The voltage measure circuit 176 may receive the antenna voltage VAN1 through the first power electrode L1 and the second power electrode L2, measure a magnitude of the antenna voltage VAN1, and provide a digital value DV, which corresponds to the measured magnitude of the antenna voltage VAN1, to the CPU 161. As will be described later, the voltage measure circuit 176 may be used to periodically detect whether an external NFC reader is near the electronic device 100 in the wireless power transmission mode.

A structure of the NFC device 130 illustrated in FIG. 7 is only an example. According to some example embodiments, the NFC device 130 may be implemented in various structures.

In some example embodiments, as illustrated in FIG. 8, when the CPU 161 receives the activated cover enable signal C_EN from the application processor 120 through the GPIO pin GPIO_P while the NFC chip 140 is in the idle state RFST_IDLE 410 or the discovery state RFST_DISCOVERY 420, the CPU 161 may back up a current state in the RF communication state machine 400, and then switch to the wireless power transmission state RFST_WPT 500. For example, the CPU 161 may back up the parameters, which are set by performing the initialization operation according to the NFC standard, and the parameters, which are set in the idle state RFST_IDLE 410 and are related with an operation in the poll mode and an operation in the listen mode, in response to the activated cover enable signal C_EN, and then switch to the wireless power transmission state RFST_WPT 500.

In the wireless power transmission state RFST_WPT 500, the NFC chip 140 may operate in the wireless power transmission mode. For example, in the wireless power transmission state RFST_WPT 500, the application processor 120 may provide the information data I_D, which is to be displayed on the display module 160 of the flip cover device 200, to the CPU 161 through the I2C bus, the CPU 161 may provide the information data I_D to the second modulator 182, the second modulator 182 may modulate the information data I_D to generate a modulation signal, the oscillator 183 may generate the carrier signal CW having a carrier frequency (e.g., approximately 13.56 MHz), the mixer 184 may generate the transmission modulation signal TMS by synthesizing the carrier signal CW with the modulation signal, the transmit circuit 185 may provide the output current ITX, which corresponds to the transmission modulation signal TMS, to the resonance circuit 150, and the resonance circuit 150 may emit the first electromagnetic wave EMW1 corresponding to the output current ITX to the flip cover device 200.

Figure 9:
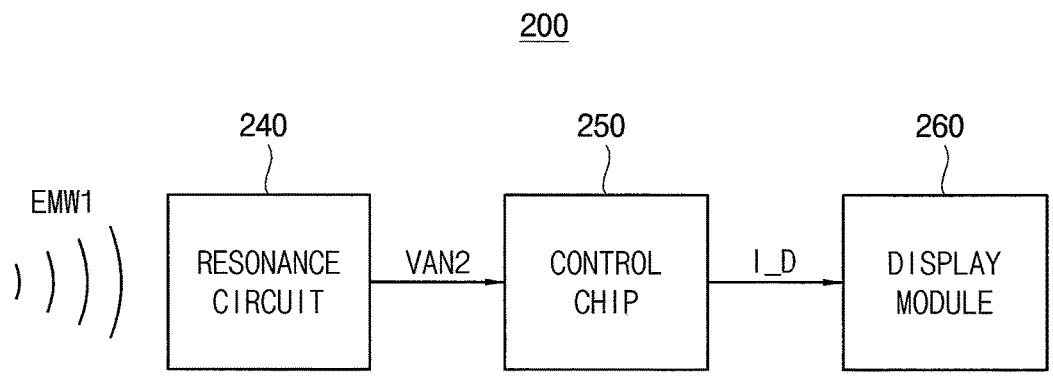
FIG. 9 is a block diagram illustrating a flip cover device included in the mobile system of FIG. 1 according to some example embodiments.

FIG. 9 is a block diagram illustrating an example of a flip cover device included in the mobile system of FIG. 1.

Referring to FIG. 9, the flip cover device 200 may include a resonance circuit 240, a control chip 250, and the display module 260.

In some example embodiments, the resonance circuit 240, the control chip 250, and the display module 260 may be disposed between the inner surface of the front side cover 220 of the flip cover device 200 and the outer surface of the front side cover 220 of the flip cover device 200.

The resonance circuit 240 may generate an antenna voltage VAN2 based on the first electromagnetic wave EMW1 received from the electronic device 100.

The control chip 250 may generate the internal operation voltage based on the antenna voltage VAN2, and operate using the internal operation voltage as a power source.

The control chip 250 may obtain the information data I_D, which is transmitted by the electronic device 100 through the first electromagnetic wave EMW1, by demodulating the antenna voltage VAN2, and provide the information data I_D to the display module 260 to display the information data I_D on the display module 260. In addition, the control chip 250 may provide power to the display module 260 by providing the internal operation voltage to the display module 260.

In some example embodiments, the display module 260 includes a graphical display device, including a display screen, configured to generate a graphical display. The display module 260 may be configured to generate a graphical display that includes one or more icons that represent one or more instances of information data. For example, the display module 260 may generate a graphical display that includes an icon that indicates a current time, an amount of electrical power stored in the electronic device, some combination thereof, or the like.

Figure 10:
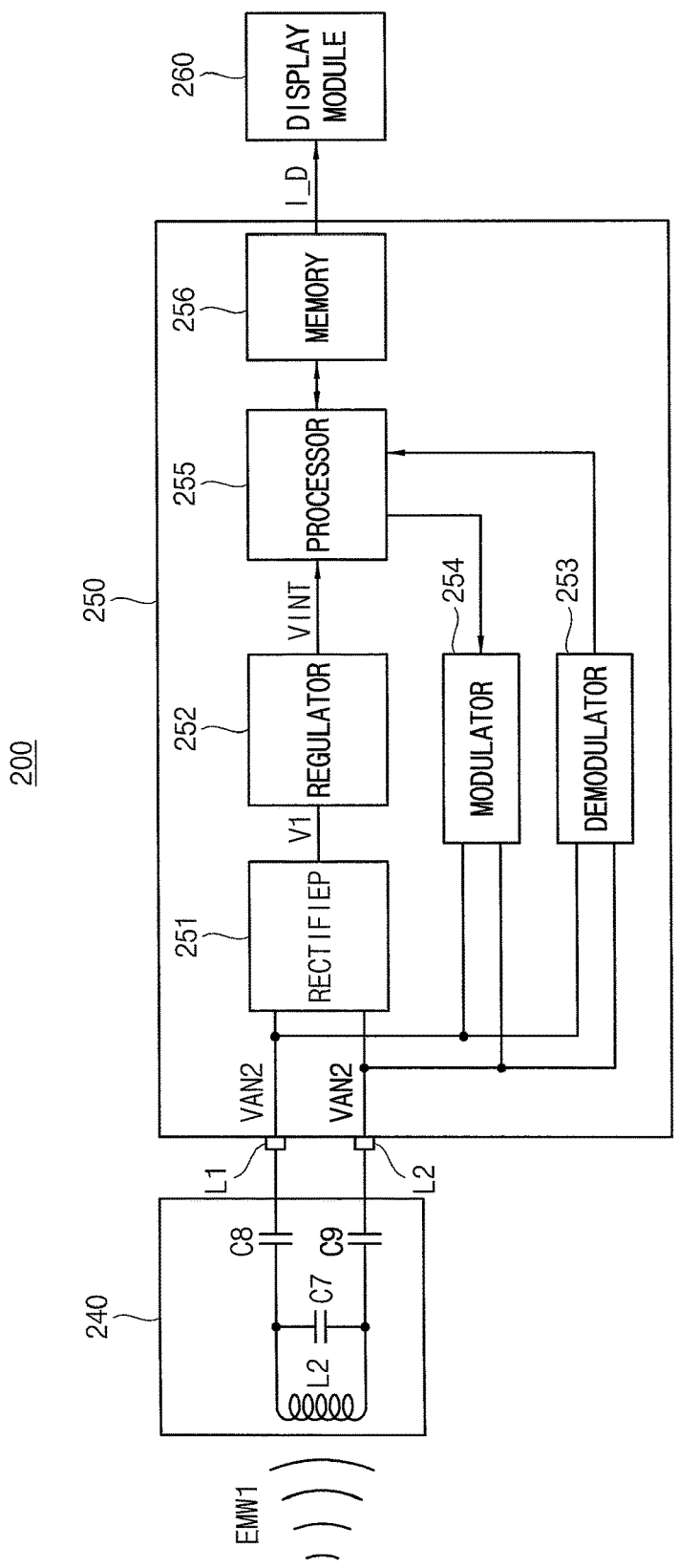
FIG. 10 is a block diagram illustrating a flip cover device according to some example embodiments.

FIG. 10 is a block diagram illustrating an example of the flip cover device of FIG. 9.

In FIG. 10, an example of the resonance circuit 240 and the control chip 250 included in the flip cover device 200 is illustrated.

Referring to FIG. 10, the control chip 250 may be connected to the resonance circuit 240 through a first power electrode L1 and a second power electrode L2.

The resonance circuit 240 may include an antenna L2 and seventh through ninth capacitors C7~C9.

The antennal L2 and the seventh capacitor C7 may be coupled in parallel to form a resonance frequency. For example, the resonance frequency formed by the antennal L2 and the seventh capacitor C7 may be about 13.56 MHz, which corresponds to a carrier frequency defined in the NFC standard. The eighth capacitor C8 may be coupled between the antenna L2 and the first power electrode L1, and the ninth capacitor C9 may be coupled between the antenna L2 and the second power electrode L2.

When the resonance circuit 240 receives the first electromagnetic wave EMW1, which has a frequency corresponding to the resonance frequency of the resonance circuit 240, from the NFC device 130 included in the electronic device 100, a mutual induction may occur between the resonance circuit 240 and the NFC device 130. Therefore, an induced voltage may be generated at terminals of the antenna L2.

The induced voltage generated at the terminals of the antenna L2 may be provided to the first power electrode L1 and the second power electrode L2 through the eighth capacitor C8 and the ninth capacitor C9, respectively, as the antenna voltage VAN2.

The control chip 250 may include a rectifier 251, a regulator 252, a demodulator 253, a modulator 254, a processor 255, and a memory 256.

The rectifier 251 may generate a first voltage V1, which is a direct voltage, by rectifying the antenna voltage VAN2 provided from the resonance circuit 240 through the first power electrode L1 and the second power electrode L2.

The regulator 252 may generate an internal voltage VINT, which has a voltage level of a desired (and/or alternatively, predetermined) magnitude usable in the control chip 250, using the first voltage V1.

The processor 255 may operate using the internal voltage VINT provided from the regulator 252.

The demodulator 253 may generate the information data I_D by demodulating the antenna voltage VAN2 provided from the resonance circuit 240 through the first power electrode L1 and the second power electrode L2, and provide the information data I_D to the processor 255. The processor 255 may temporary store the information data I_D in the memory 256 and provide the information data I_D to the display module 260.

In addition, the processor 255 may provide a response signal to the modulator 254, and the modulator 254 may modulate the response signal and provide a modulation signal to the first power electrode L1 and the second power electrode L2. For example, the modulator 254 may generate the modulation signal by performing a load modulation on the response signal.

The resonance circuit 240 may reflect the first electromagnetic wave EMW1, which is received from the electronic device 100, based on the modulation signal generated by the modulator 254 to transmit the response signal to the electronic device 100.

The memory 256 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The processor 255 may be, a central processing unit (CPU), a controller, or an application-specific integrated circuit (ASIC), that when, executing instructions stored in the memory, configures the processor as a special purpose computer to perform the operations of the control chip 250.

A structure of the resonance circuit 240 and the control chip 250 illustrated in FIG. 10 is only an example. According to some example embodiments, the resonance circuit 240 and the control chip 250 may be implemented in various structures.

FIG. 11, FIG. 12, FIG. 13, and FIG. 14 are diagrams for describing an operation of the mobile system of FIG. 1.

Hereinafter, an operation of the mobile system 10 will be described with reference to FIGS. 1 to 14.

Figure 11:
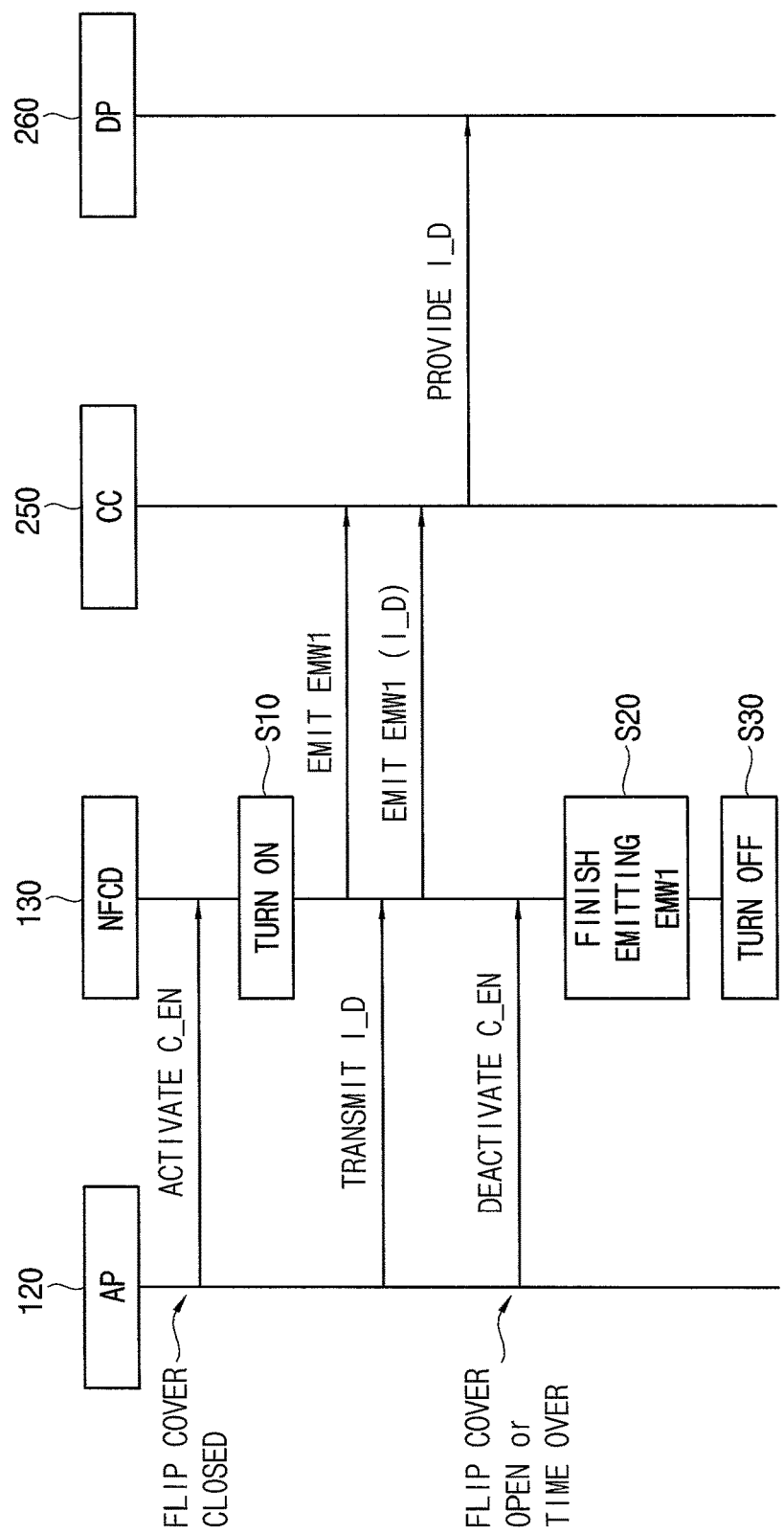
FIG. 11, FIG. 12, FIG. 13, and FIG. 14 are diagrams for describing an operation of the mobile system of FIG. 1.

FIG. 11 illustrates an operation of the mobile system 10 when the flip cover device 200 changes from the open state to the closed state while the NFC device 130 is in the turned off state. Operations implemented by one or more of the application processor 120, control chip 250, display module 260, and NFC device 130 may be implemented by one or more processors included therein, respectively. Such processors may respectively execute one or more instances of computer-readable instructions to implement said operations. Such one or more instances of computer-readable instructions may be stored in one or more memories that may be included in respective ones of the application processor 120, control chip 250, display module 260, and NFC device 130.

Referring to FIG. 11, when the flip cover device 200 changes from the open state to the closed state while the NFC device 130 is in the turned off state, the sensor 110 may transition the state signal ST_S from the second logic level to the first logic level, and the application processor AP 120 may activate the cover enable signal C_EN by transitioning the voltage of the GPIO pin GPIO_P to the logic high level in response to the state signal ST_S transitioning from the second logic level to the first logic level.

The NFC device NFCD 130 may be turned on in response to the activated cover enable signal C_EN (step S10). After turning on, the NFC device 130 may directly enter in the wireless power transmission mode to emit the first electromagnetic wave EMW1 corresponding to the carrier signal CW to the flip cover device 200 without performing the initialization operation defined in the NCI standard. The control chip CC 250 included in the flip cover device 200 may be turned on using power transmitted through the first electromagnetic wave EMW1.

After that, the application processor 120 may transmit the information data I_D to the NFC device 130, and the NFC device 130 may generate the transmission modulation signal TMS by synthesizing the carrier signal CW with the information data I_D and emit the first electromagnetic wave EMW1 corresponding to the transmission modulation signal TMS to the flip cover device 200.

The control chip 250 included in the flip cover device 200 may obtain the information data I_D based on the first electromagnetic wave EMW1 and provide the information data I_D to the display module 260, and the display module 260 may display the information data I_D.

If the NFC device 130 performs the initialization operation by performing a handshaking process with the application processor 120 according to the NCI standard when turning on, the emission of the first electromagnetic wave EMW1 from the NFC device 130 may be delayed because of the initialization operation.

However, in the wireless power transmission mode, the NFC device 130 may not communicate with an external NFC device but communicate with the flip cover device 200 included in the mobile system 10. Therefore, various parameters required for performing a standard NFC may not be used in the wireless power transmission mode.

Therefore, as described above, in the mobile system 10 according to some example embodiments, when the flip cover device 200 changes from the open state to the closed state while the NFC device 130 is in the turned off state, the NFC device 130 may be turned on and directly enter in the wireless power transmission mode without performing the initialization operation defined in the NCI standard to immediately emit the first electromagnetic wave EMW1 using desired (and/or alternatively, predetermined) parameters. Therefore, although the flip cover device 200 changes from the open state to the closed state while the NFC device 130 is in the turned off state, the mobile system 10 according to some example embodiments may immediately display the information data I_D on the display module 260 included in the flip cover device 200.

When the flip cover device 200 changes from the closed state to the open state in the wireless power transmission mode, the sensor 110 may transition the state signal ST_S from the first logic level to the second logic level, and the application processor AP 120 may deactivate the cover enable signal C_EN by transitioning the voltage of the GPIO pin GPIO_P to the logic low level in response to the state signal ST_S transitioning from the first logic level to the second logic level.

In addition, when the flip cover device 200 maintains in the closed state during the information display time period after the flip cover device 200 switches from the open state to the closed state, the application processor 120 may deactivate the cover enable signal C_EN by transitioning the voltage of the GPIO pin GPIO_P to the logic low level regardless of a logic level of the state signal ST_S to reduce a battery consumption.

The NFC device 130 may finish emitting the first electromagnetic wave EMW1 in response to the deactivated cover enable signal C_EN (step S20), and be turned off (step S30).

Figure 12:
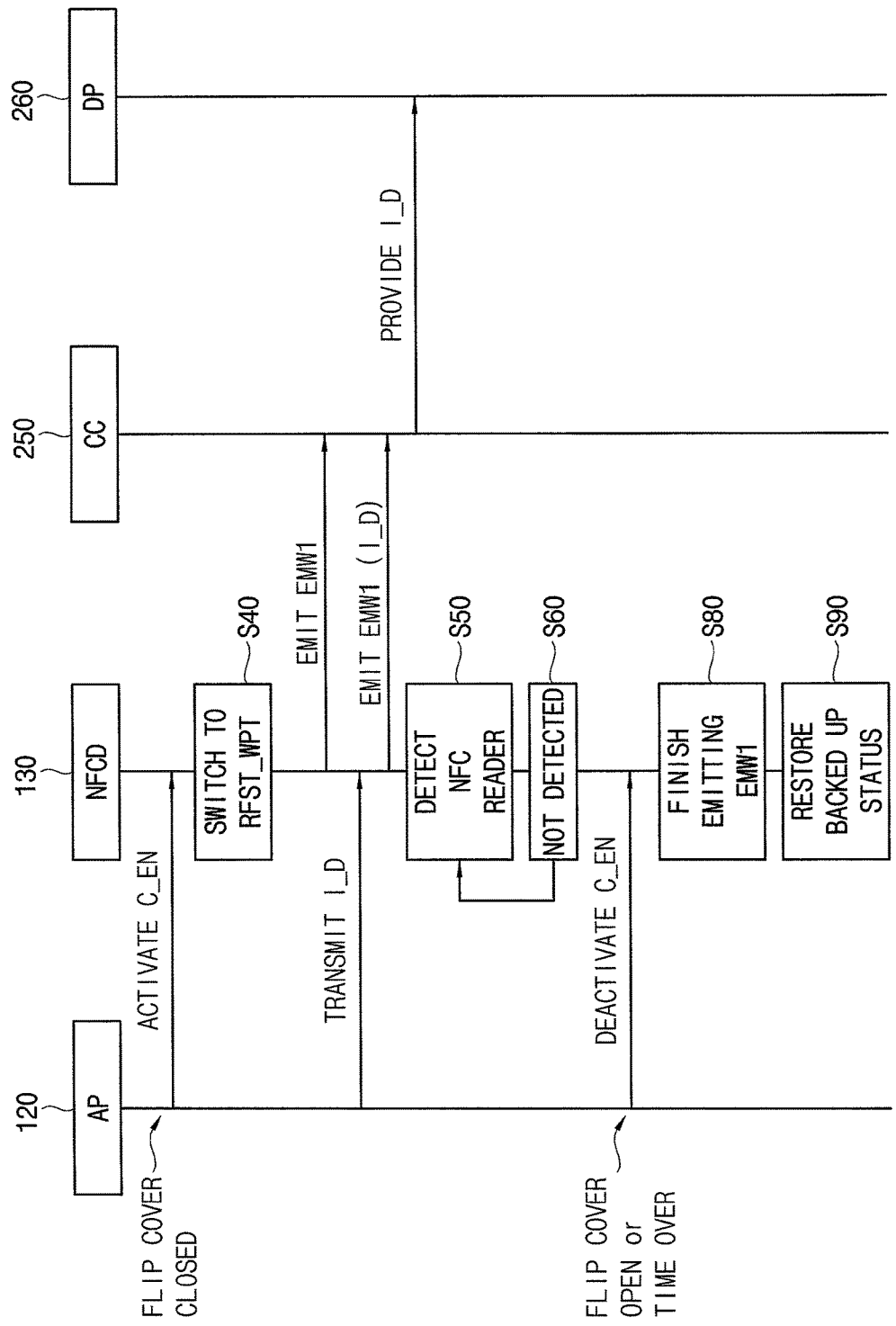
Figure 13:
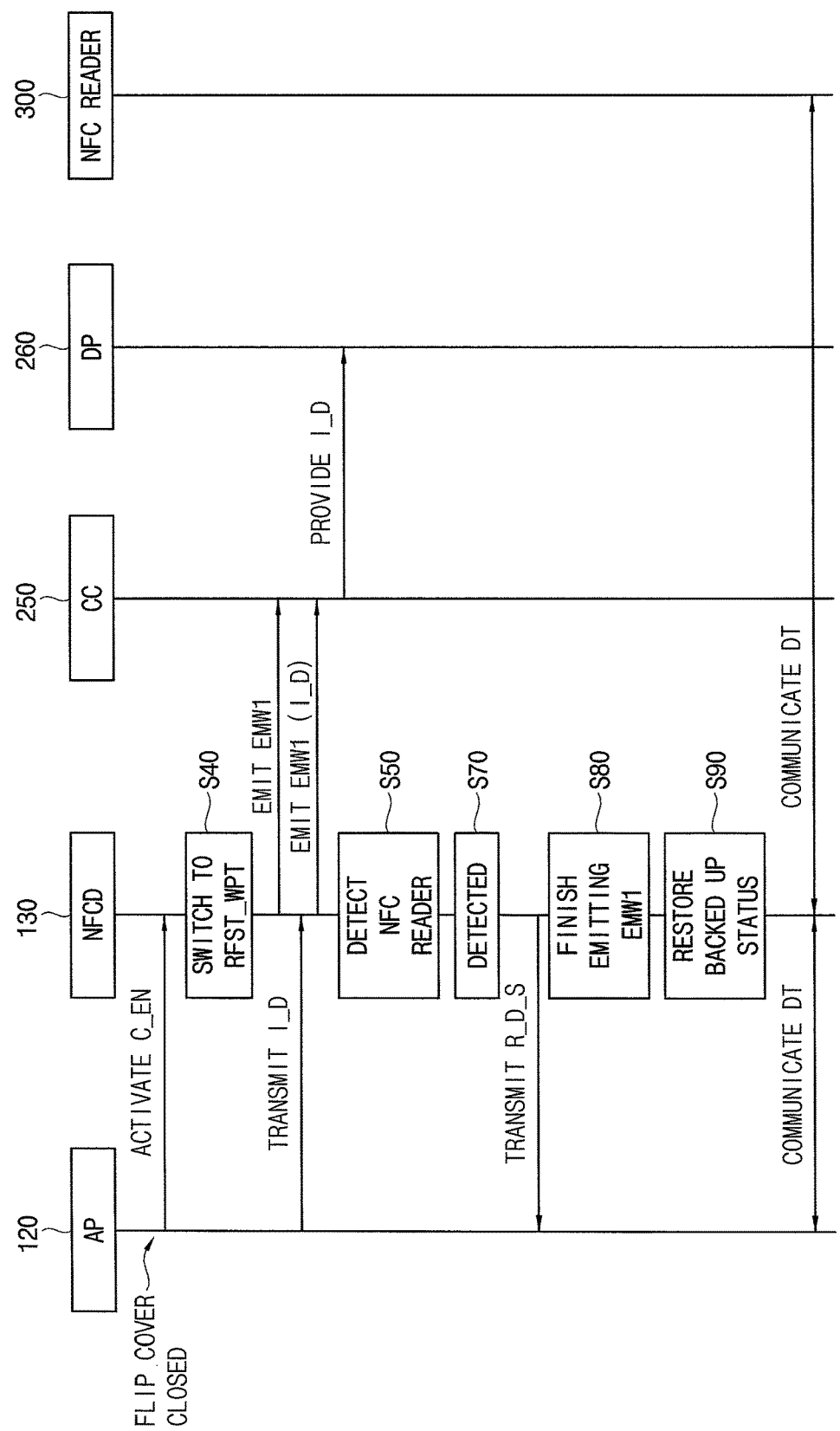

FIG. 12 and FIG. 13 illustrate an operation of the mobile system 10 when the flip cover device 200 changes from the open state to the closed state while the NFC device 130 is in the turned on state.

As described above, when the NFC device 130 is turned on, the NFC device 130 may perform the initialization operation by performing a handshaking process with the application processor 120 according to the NCI standard, and then stay in the idle state RFST_IDLE 410 or stay in the discovery state RFST_DISCOVERY 420 alternately operating in the poll mode and in the listen mode.

When the flip cover device 200 changes from the open state to the closed state while the NFC device 130 is in the idle state RFST_IDLE 410 or the discovery state RFST_DISCOVERY 420 in the NCI mode, the sensor 110 may transition the state signal ST_S from the second logic level to the first logic level, and the application processor 120 may activate the cover enable signal C_EN by transitioning the voltage of the GPIO pin GPIO_P to the logic high level in response to the state signal ST_S transitioning from the second logic level to the first logic level.

As illustrated in FIGS. 8, 12 and 13, when the NFC device 130 receives the activated cover enable signal C_EN while the NFC device 130 is turned on, the NFC device 130 may back up a current state without changing a state on the RF communication state machine 400, and then switch to the wireless power transmission state RFST_WPT 500 to operate in the wireless power transmission mode (step S40). For example, when the NFC device 130 receives the activated cover enable signal C_EN while the NFC device 130 is in the idle state RFST_IDLE 410, the NFC device 130 may back up the parameters, which are set by performing the initialization operation according to the NFC standard, in the idle state RFST_IDLE 410 and then switch to the wireless power transmission state RFST_WPT 500 to operate in the wireless power transmission mode. When the NFC device 130 receives the activated cover enable signal C_EN while the NFC device 130 is in the discovery state RFST_DISCOVERY 420, the NFC device 130 may back up the parameters, which are set by performing the initialization operation according to the NFC standard, and the parameters, which are set in the idle state RFST_IDLE 410 and are related with an operation in the poll mode and an operation in the listen mode, in the discovery state RFST_DISCOVERY 420 without returning to the idle state RFST_IDLE 410, and then switch to the wireless power transmission state RFST_WPT 500 to operate in the wireless power transmission mode.

After the NFC device 130 switches to the wireless power transmission state RFST_WPT 500, the NFC device 130 may emit the first electromagnetic wave EMW1 corresponding to the carrier signal CW to the flip cover device 200. The control chip 250 included in the flip cover device 200 may be turned on using power transmitted through the first electromagnetic wave EMW1.

After that, the application processor 120 may transmit the information data I_D to the NFC device 130, and the NFC device 130 may generate the transmission modulation signal TMS by synthesizing the carrier signal CW with the information data I_D and emit the first electromagnetic wave EMW1 corresponding to the transmission modulation signal TMS to the flip cover device 200.

The control chip 250 included in the flip cover device 200 may obtain the information data I_D based on the first electromagnetic wave EMW1 and provide the information data I_D to the display module 260, and the display module 260 may display the information data I_D.

As illustrated in FIGS. 12 and 13, in the wireless power transmission mode, the NFC device 130 may periodically stop emitting the first electromagnetic wave EMW1 to detect whether an external NFC reader 300 is near the electronic device 100 (step S50).

Figure 14:
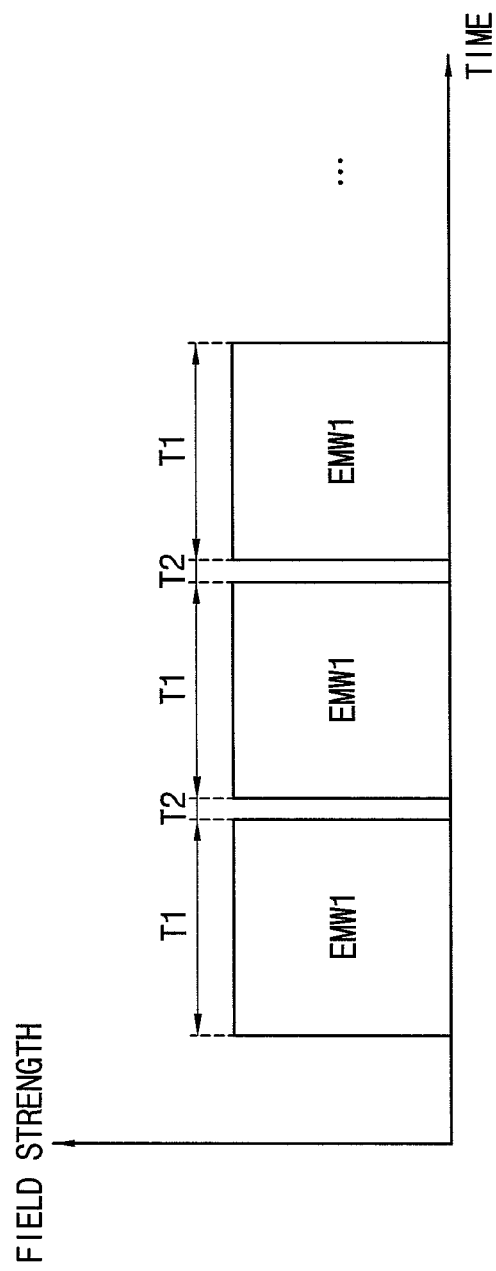

FIG. 14 illustrates an example of an operation of the NFC device 130 in the wireless power transmission mode in which the NFC device 130 periodically stops emitting the first electromagnetic wave EMW1 to detect whether an external NFC reader 300 is near the electronic device 100.

Referring to FIG. 14, in the wireless power transmission mode, the NFC device 130 may emit the first electromagnetic wave EMW1 to the flip cover device 200 during a first time period T1, and alternately, stop emitting the first electromagnetic wave EMW1 to detect whether an external NFC reader 300 is near the electronic device 100 during a second time period T2.

The second time period T2 may be much shorter than the first time period T1. In some example embodiments, the first time period T1 may correspond to one second and the second time period T2 may correspond to 200 us. The control chip 250 and the display module 260 may include a capacitor storing the power received from the electronic device 100 through the first electromagnetic wave EMW1. Therefore, although the emission of the first electromagnetic wave EMW1 is stopped during the second time period T2, which is very short, the control chip 250 and the display module 260 may not be turned off and be maintained in a turned on state.

In some example embodiments, during the second time period T2, the voltage measure circuit 176 included in the NFC device 130 may measure a magnitude of the antenna voltage VAN1, which is generated by the resonance circuit 150 based on the second electromagnetic wave EMW2 received from an external NFC reader 300, and provide the digital value DV, which corresponds to the measured magnitude of the antenna voltage VAN1, to the CPU 161. The CPU 161 may determine that an external NFC reader 300 is detected near the electronic device 100 when the digital value DV is greater than a threshold value.

FIG. 12 illustrates an operation of the mobile system 10 when the NFC device 130 does not detect an external NFC reader 300 in the wireless power transmission mode.

Referring to FIG. 12, when the NFC device 130 does not detect the external NFC reader 300 in the wireless power transmission mode (step S60), the NFC device 130 may emit the first electromagnetic wave EMW1 to the flip cover device 200 during the first time period T1, and alternately, stop emitting the first electromagnetic wave EMW1 to detect whether an external NFC reader 300 is near the electronic device 100 during the second time period T2 repeatedly.

When the flip cover device 200 changes from the closed state to the open state in the wireless power transmission mode, the sensor 110 may transition the state signal ST_S from the first logic level to the second logic level, and the application processor 120 may deactivate the cover enable signal C_EN by transitioning the voltage of the GPIO pin GPIO_P to the logic low level in response to the state signal ST_S transitioning from the first logic level to the second logic level.

In addition, when the flip cover device 200 maintains in the closed state during the information display time period after the flip cover device 200 switches from the open state to the closed state, the application processor 120 may deactivate the cover enable signal C_EN by transitioning the voltage of the GPIO pin GPIO_P to the logic low level regardless of a logic level of the state signal ST_S to reduce a battery consumption.

The NFC device 130 may finish emitting the first electromagnetic wave EMW1 in response to the deactivated cover enable signal C_EN (step S80). After that, the NFC device 130 may switch from the wireless power transmission mode to the NCI mode, restore the backed up state, and restart operations according to the NCI standard (step S90).

As described above, in the mobile system 10 according to some example embodiments, when the NFC device 130 switches from the wireless power transmission mode to the NCI mode, the NFC device 130 may directly return to a previous state in the RF communication state machine 400, that is, the idle state RFST_IDLE 410 or the discovery state RFST_DISCOVERY 420, and restore the backed up parameters to restart operations according to the NCI standard. Therefore, the electronic device 100 may rapidly switch from the wireless power transmission mode to the NCI mode.

FIG. 13 illustrates an operation of the mobile system 10 when the NFC device 130 detects an external NFC reader 300 in the wireless power transmission mode.

Referring to FIG. 13, when the NFC device 130 detects the external NFC reader 300 in the wireless power transmission mode (step S70), the NFC device 130 may transmit a reader detection signal R_D_S to the application processor 120 and finish emitting the first electromagnetic wave EMW1 (step S80). After that, the NFC device 130 may switch from the wireless power transmission mode to the NCI mode, restore the backed up state, and restart operations according to the NCI standard (step S90).

For example, if the NFC device 130 switches from the discovery state RFST_DISCOVERY 420 to the wireless power transmission state RFST_WPT 500 in response to the activated cover enable signal C_EN and then detects the external NFC reader 300 in the wireless power transmission state RFST_WPT 500, the NFC device 130 may directly return to the backed up state, that is, the discovery state RFST_DISCOVERY 420, and then enter in the listen active state RFST_LISTEN_ACTIVE 440. Therefore, when the application processor 120 receives the reader detection signal R_D_S from the NFC device 130, the application processor 120 may communicate data DT with the external NFC reader 300 using the NFC device 130.

In some example embodiments, the external NFC reader 300 may correspond to an NFC payment terminal. In this case, when the mobile system 10 approaches to the NFC payment terminal while the electronic device 100 transmits the information data I_D to the flip cover device 200 through the first electromagnetic wave EMW1 in the wireless power transmission mode, the electronic device 100 may immediately finish emitting the first electromagnetic wave EMW1 and perform an electronic payment by transmitting payment information to the NFC payment terminal using the NFC device 130.

As described above with reference to FIGS. 1 to 14, the flip cover device 200 may receive the power and the information data I_D from the electronic device 100 not through an electric wiring but through the first electromagnetic wave EMW1 emitted from the NFC device 130 included in the electronic device 100. Therefore, the mobile system 10 may be implemented without an electric wiring connecting the flip cover device 200 and the electronic device 100. As such, a size of the electronic device 100 may be reduced and a manufacturing cost of the electronic device 100 may be decreased.

In addition, when the mobile system 10 approaches to the external NFC reader 300 while the electronic device 100 transmits the information data I_D to the flip cover device 200 through the first electromagnetic wave EMW1 in the wireless power transmission mode, the electronic device 100 may rapidly switch from the wireless power transmission mode to the NCI mode to communicate with the external NFC reader 300. Therefore, the mobile system 10 according to some example embodiments may effectively display the information data I_D on the flip cover device 200 through NFC without degrading an NFC performance of the mobile system 10.

Figure 15:
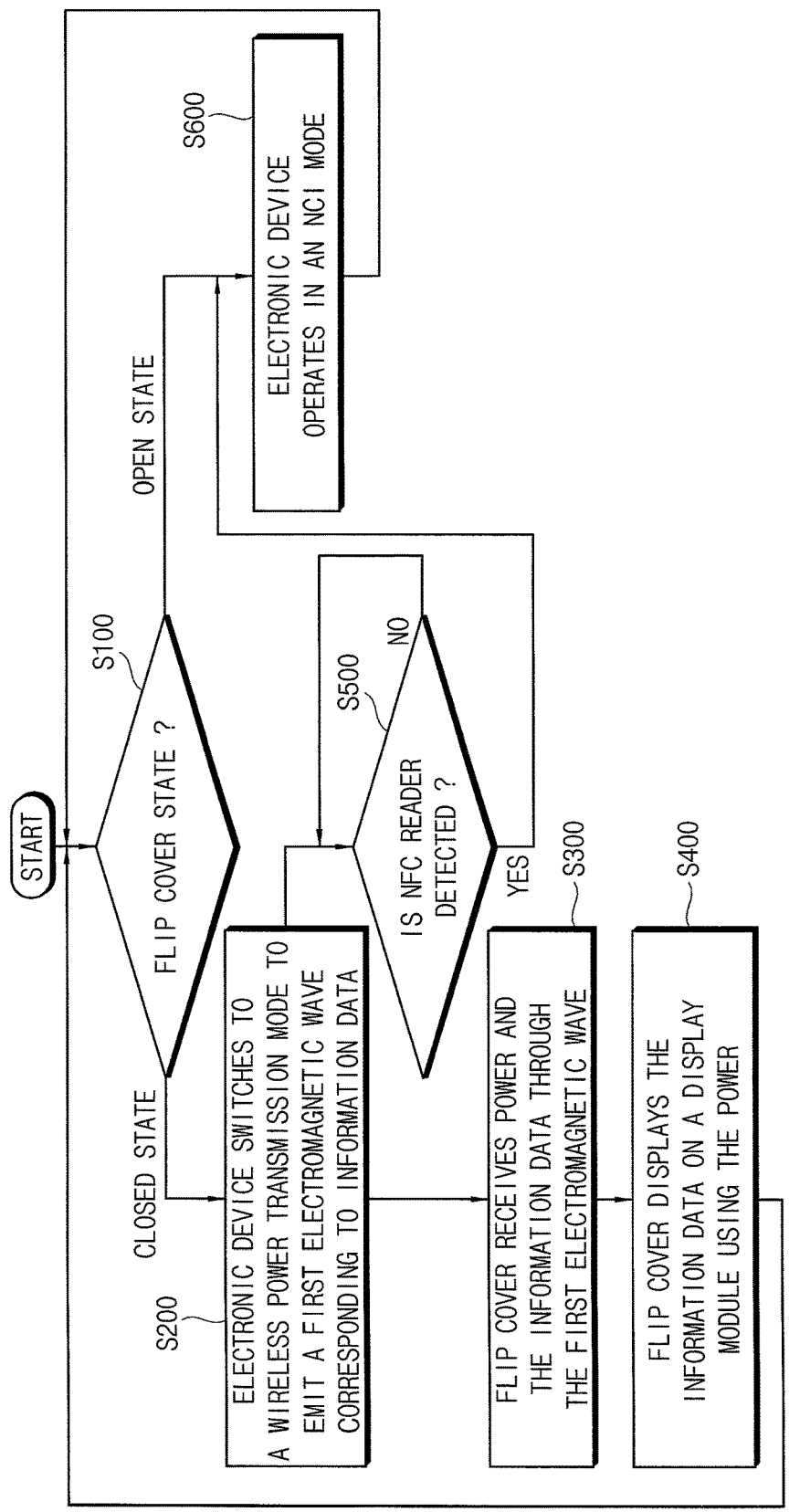
FIG. 15 is a flow chart illustrating a method of operating a mobile system according to some example embodiments.

FIG. 15 is a flow chart illustrating a method of operating a mobile system according to some example embodiments.

The method of operating a mobile system of FIG. 15 may be performed by the mobile system 10 illustrated in FIGS. 1 to 5.

Hereinafter the method of operating the mobile system 10 will be described with reference to FIGS. 1 to 15.

The electronic device 100 may determine whether the flip cover device 200 is in the closed state or in the open state (step S100).

When the flip cover device 200 is in the closed state, the electronic device 100 may switch to the wireless power transmission mode to emit the first electromagnetic wave EMW1 corresponding to the information data I_D to the flip cover device 200 (step S200).

The flip cover device 200 may receive the power and the information data I_D from the electronic device 100 through the first electromagnetic wave EMW1 (step S300). For example, the flip cover device 200 may generate the internal operation voltage using the first electromagnetic wave EMW1 received from the electronic device 100, and obtain the information data I_D by demodulating the first electromagnetic wave EMW1 using the internal operation voltage.

After that, the flip cover device 200 may display the information data I_D on the display module 260 using the power (step S400).

When the flip cover device 200 is in the open state, the electronic device 100 may finish emitting the first electromagnetic wave EMW1, and switch to the NCI mode to perform operations according to the NCI standard (step S600).

In some example embodiments, while the flip cover device 200 is in the closed state, the electronic device 100 may periodically stop emitting the first electromagnetic wave EMW1 to detect whether an external NFC reader 300 is near the electronic device 100 (step S500).

When the electronic device 100 detects an external NFC reader 300 near the electronic device 100, the electronic device 100 may immediately finish emitting the first electromagnetic wave EMW1, and switch to the NCI mode to perform operations according to the NCI standard (step S600).

Figure 16:
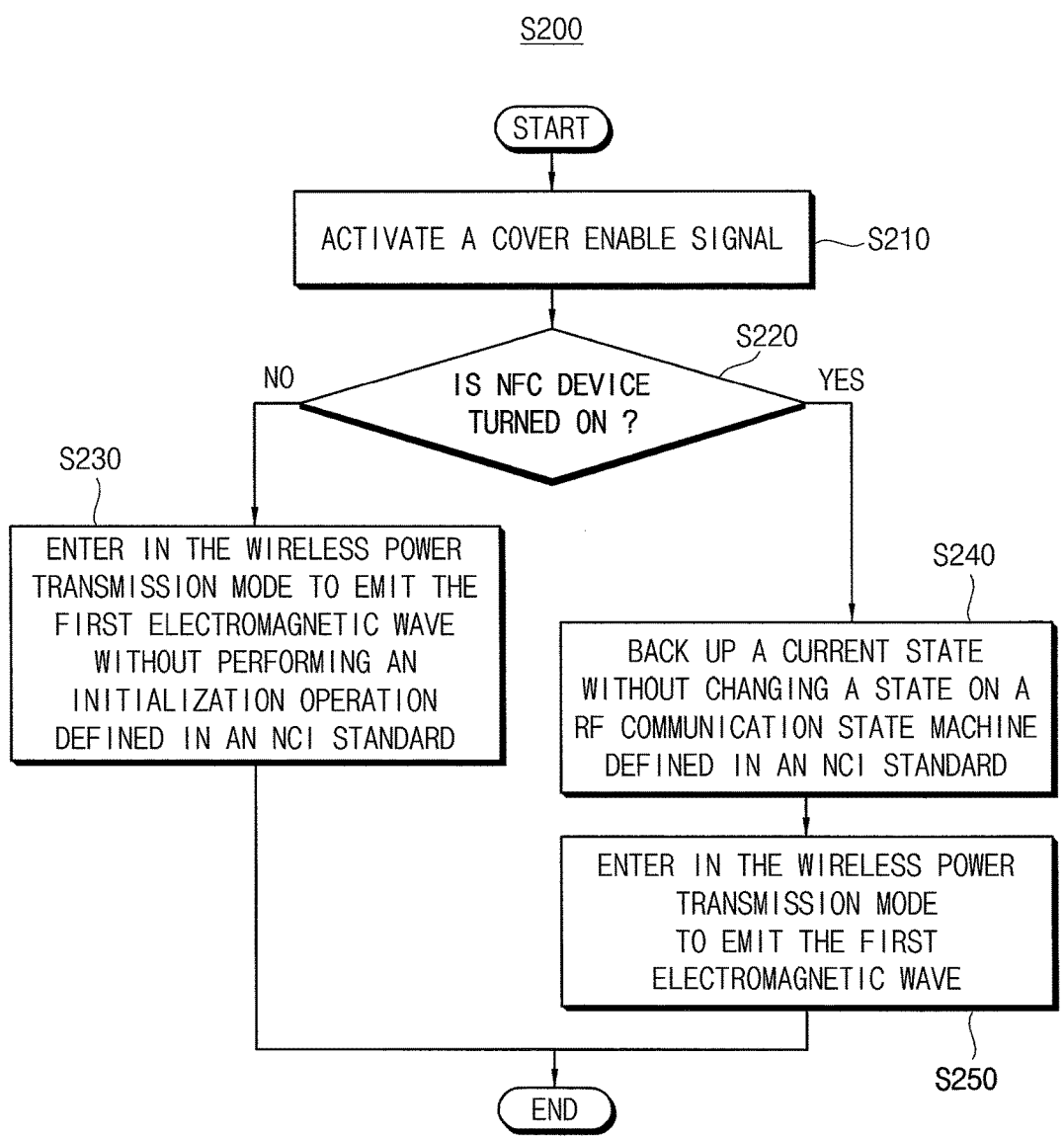
FIG. 16 is a flow chart illustrating an example of a process of switching to a wireless power transmission mode to emit a first electromagnetic wave of FIG. 15 according to some example embodiments.

FIG. 16 is a flow chart illustrating an example of a process of switching to a wireless power transmission mode to emit a first electromagnetic wave of FIG. 15.

Referring to FIG. 16, when the flip cover device 200 changes to the closed state, the application processor 120 included in the electronic device 100 may activate the cover enable signal C_EN (step S210).

If the NFC device 130 is in the turned off state when the cover enable signal C_EN is activated (step S220; no), the NFC device 130 may be turned on in response to the activated cover enable signal C_EN, and directly enter in the wireless power transmission mode to emit the first electromagnetic wave EMW1 without performing the initialization operation defined in the NCI standard (step S230).

If the NFC device 130 is in the turned on state when the cover enable signal C_EN is activated (step S220; yes), the NFC device 130 may back up a current state without changing a state on the RF communication state machine 400 (step S240), and then switch to the wireless power transmission mode to emit the first electromagnetic wave EMW1 (step S250).

In some example embodiments, the NFC device 130 may emit the first electromagnetic wave EMW1 to the flip cover device 200 during the first time period T1, and alternately, stop emitting the first electromagnetic wave EMW1 to detect whether an external NFC reader 300 is near the electronic device 100 during the second time period T2. When the NFC device 130 detects an external NFC reader 300, the NFC device 130 may transmit the reader detection signal R_D_S to the application processor 120, finish emitting the first electromagnetic wave EMW1, and switch to the NCI mode to return to the backed up state. When the application processor 120 receives the reader detection signal R_D_S from the NFC device 130, the application processor 120 may communicate with the external NFC reader 300 using the NFC device 130.

A structure and an operation of the mobile system 10 of FIGS. 1 to 5 are described above with reference to FIGS. 1 to 14. Therefore, detailed description of the steps of FIGS. 15 and 16 will be omitted.

Figure 17:
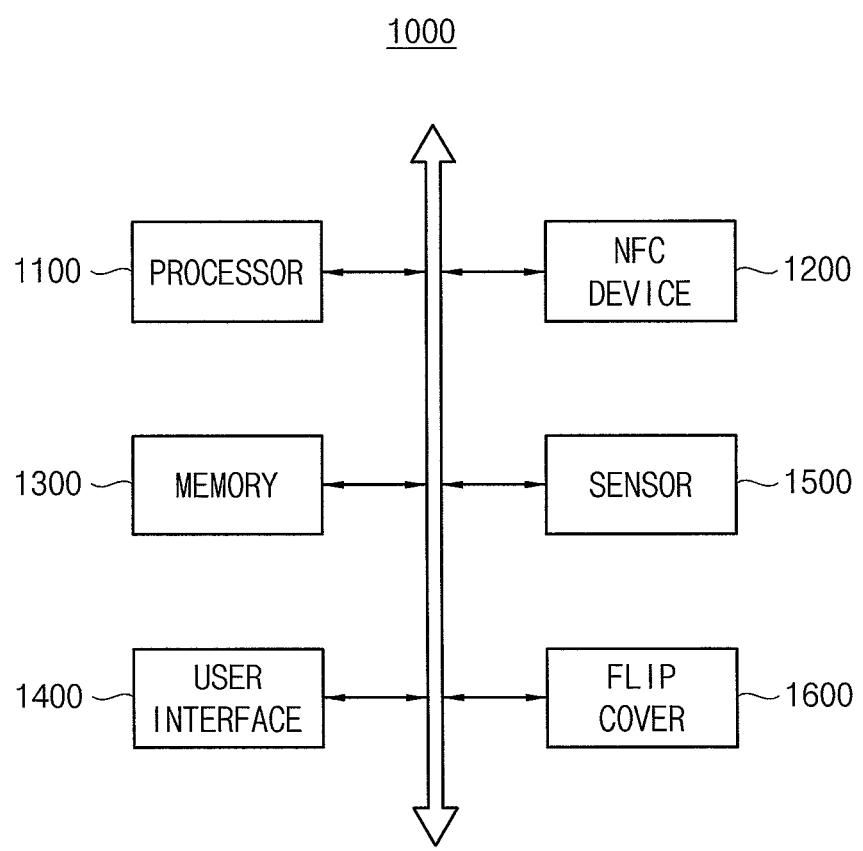
FIG. 17 is a block diagram illustrating an electronic system according to some example embodiments.

FIG. 17 is a block diagram illustrating an electronic system according to some example embodiments.

Referring to FIG. 17, an electronic system 1000 includes an application processor AP 1100, an NFC device 1200, a memory device 1300, a user interface 1400, a sensor 1500, and a flip cover device 1600. In some example embodiments, the electronic system 1000 may be arbitrary mobile systems, such as a mobile phone, a smart phone, a personal digital assistant (PDA), a portable multimedia player (PMP), a digital camera, a camcorder, a music player, a portable game console, a navigation system, etc.

In some example embodiments, some or all of the electronic system 1000 may be included in one or more of the elements described above. For example, some or all of the electronic system 1000 may be included in one or more of the electronic device 100, the flip cover device 200, the application processor 120, the control chip 250, the display module 260, and the NFC device 130.

The processor 1100 controls overall operations of the electronic system 1000. The processor 1100 may execute applications (e.g., computer-readable instructions), such as a web browser, a game application, a video player, etc. In some example embodiments, the processor 1100 may include a single core or multiple cores. For example, the processor 1100 may be a multi-core processor, such as a dual-core processor, a quad-core processor, a hexa-core processor, etc. The processor 1100 may include an internal or external cache memory.

The memory device 1300 stores various data. For example, the memory device 1300 may store a boot image for booting the electronic system 1000, output data to be outputted to an external device, and input data received from the external device. In some example embodiments, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The processor 1100 may be a central processing unit (CPU), a controller, or an application-specific integrated circuit (ASIC), that when, executing computer-readable instructions stored in the memory 1300, configures the processor 1100 as a special purpose computer to perform the operations of one or more of the electronic device 100, the flip cover device 200, the application processor 120, the control chip 250, the display module 260, and the NFC device 130. For example, the processor 1100 may perform one or more of the operations illustrated in FIGS. 11-16 based on executing one or more instances of computer-readable instructions, and the computer readable instructions may be stored at the memory 1300.

The flip cover device 1600 is installed on a back surface of the electronic system 1000 to surround the back surface of the electronic system 1000 and selectively covers a front surface of the electronic system 1000. The flip cover device 1600 may include a display module.

The sensor 1500 detects whether the flip cover device 1600 is in a closed state or in an open state, and generates a state signal representing whether the flip cover device 1600 is in the closed state or in the open state.

The NFC device 1200 transmits the output data stored in the memory device 1300 to an external device through NFC. The NFC device 1200 receives input data from the external device through NFC to store the input data in the memory device 1300.

When the processor 1100 receives the state signal representing that the flip cover device 1600 is changed to the closed state, the processor 1100 may emit a first electromagnetic wave corresponding to information data, which is to be displayed on the display module of the flip cover device 1600, using the NFC device 1200. For example, the information data may include a current time, a remaining battery level, a volume level of a sound, etc. In some example embodiments, a frequency of the first electromagnetic wave may be about 13.56 MHz, which corresponds to a carrier frequency defined in an NFC standard.

The flip cover device 200 may receive power and the information data from the NFC device 1200 through the first electromagnetic wave, and display the information data on the display module using the power.

The user interface 1400 may include at least one input device, such as a keypad, a touch screen, etc., and at least one output device, such as a speaker, a display device, etc.

In some example embodiments, the electronic system 1000 may further include an image processor, and/or a storage device, such as a memory card, a solid state drive (SSD), etc.

The processor 1100, the NFC device 1200, the sensor 1500, and the flip cover device 1600 may be implemented with the application processor 120, the NFC device 130, the sensor 110, and the flip cover device 200 included in the mobile system 10, respectively. A structure and an operation of the mobile system 10 of FIGS. 1 to 5 are described above with reference to FIGS. 1 to 14. Therefore, detailed description of the processor 1100, the NFC device 1200, the sensor 1500, and the flip cover device 1600 will be omitted.

In some example embodiments, the electronic system 1000 and/or components of the electronic system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

It should be understood that example embodiments described herein should be considered in a descriptive sense only and not for purposes of limitation. Descriptions of features or aspects within each device or method according to some example embodiments should typically be considered as available for other similar features or aspects in other devices or methods according to some example embodiments. While some example embodiments have been particularly shown and described, it will be understood by one of ordinary skill in the art that variations in form and detail may be made therein without departing from the spirit and scope of the claims.

What is claimed is:

1. A mobile system, comprising:
    an electronic device configured to communicate with an external device through a near field communication (NFC) scheme; and
    a flip cover device configured to receive electrical power and information data from the electronic device through a first electromagnetic wave emitted from the electronic device,
    the flip cover device being further configured to display the information data received from the electronic device based on the received electrical power,
    the flip cover device including,
        a back side cover, which is installed on a back surface of the electronic device to surround the back surface of the electronic device,
        a front side cover, which selectively covers a front surface of the electronic device and includes a display module, the flip cover device being configured to display the information data on the display module, and
        a connector device that connects the back side cover to the front side cover,
    wherein the electronic device includes,
        a sensor configured to generate a state signal representing whether the flip cover device is in a closed state or in an open state;
        a memory storing computer-readable instructions;
        a processor configured to execute computer-readable instructions to,
            activate a cover enable signal and to output the information data based on a determination that the flip cover device is in the closed state, and selectively deactivate the cover enable signal based on whether the state signal represents that the flip cover device is in the open state; and an NFC device configured to,
switch to a wireless power transmission mode to emit the first electromagnetic wave corresponding to the information data based on the cover enable signal being activated, and
finish emitting the first electromagnetic wave and switch to an NFC controller interface (NCI) mode to perform an operation defined in an NCI standard, based on the cover enable signal being deactivated.

2. The mobile system of claim 1, wherein,
the flip cover device is configured to receive the electrical power and the information data from the electronic device through the first electromagnetic wave based on the flip cover device being in the closed state, such that the front side cover of the flip cover device covers a front surface of the electronic device, and
the electronic device is configured to inhibit emission of the first electromagnetic wave based on the flip cover device being in the open state, such that the front surface of the electronic device is exposed to an exterior environment.

3. The mobile system of claim 2, wherein,
the electronic device is configured to periodically inhibit emission of the first electromagnetic wave and detect whether at least one external NFC reader is near the electronic device, based on the flip cover device being in the closed state, and
the electronic device is configured to, in response to detecting at least one external NFC reader near the electronic device, inhibit emission of the first electromagnetic wave and initiate communication with the external NFC reader.

4. The mobile system of claim 1, wherein,
the processor is further configured to execute computer-readable instructions to transmit the cover enable signal through a general purpose input output (GPIO) pin, and
the NFC device is configured to receive the cover enable signal through the general purpose input output (GPIO) pin.

5. The mobile system of claim 1, wherein,
the NFC device is configured to selectively enter an activated state and enter the wireless power transmission mode to emit the first electromagnetic wave independently of performing an initialization operation defined in the NCI standard, based on the processor executing computer-readable instructions to activate the cover enable signal while the NFC device is deactivated.

6. The mobile system of claim 1, wherein,
the NFC device is configured to, based on the processor executing computer-readable instructions to activate the cover enable signal while the NFC device is in an activated state,
back up a current state without changing a state on a radio frequency (RF) communication state machine defined in the NCI standard, and
enter in the wireless power transmission mode to emit the first electromagnetic wave.

7. The mobile system of claim 1, wherein,
the NFC device is configured to, in the wireless power transmission mode,
emit the first electromagnetic wave to the flip cover device during a first time period, and
inhibit emission of the first electromagnetic wave, during a second time period, to detect whether an external NFC reader is near the electronic device.

8. The mobile system of claim 7, wherein,
the NFC device is configured to, during the second time period,
measure a magnitude of an antenna voltage generated based on a second electromagnetic wave received from an exterior environment, and
determine that the external NFC reader is detected near the electronic device based on the magnitude of the antenna voltage being greater than a reference magnitude.

9. The mobile system of claim 7, wherein,
the NFC device is configured to, based on detecting the external NFC reader near the electronic device while the NFC device is in the wireless power transmission mode,
inhibit emission of the first electromagnetic wave,
transmit a reader detection signal to the processor, and switch to the NCI mode.

10. The mobile system of claim 9, wherein,
the processor is configured to execute computer-readable instructions to communicate with the external NFC reader using the NFC device, based on receiving the reader detection signal from the NFC device.

11. The mobile system of claim 10, wherein,
the processor is configured to execute computer-readable instructions to perform an electronic payment, based on transmitting payment information to the external NFC reader using the NFC device, based on a determination that the external NFC reader corresponds to an NFC payment terminal.

12. The mobile system of claim 1, wherein,
the processor is configured to execute computer-readable instructions to deactivate the cover enable signal after an elapse of an information display time period, the information display time period initiating at a time at which the processor executes computer-readable instructions to activate the cover enable signal.

13. The mobile system of claim 1, wherein the flip cover device further includes,
a resonance circuit configured to generate an antenna voltage based on the first electromagnetic wave received from the electronic device; and
a control chip configured to,
generate an internal operation voltage based on the antenna voltage,
obtain the information data based on demodulating the antenna voltage, and
provide the information data to the display module.

14. The mobile system of claim 1, wherein,
the flip cover device includes at least one contact area configured to contact the electronic device, and the at least one contact area exclusively includes one or more electric insulation materials.

15. A mobile electronic device, comprising:
a sensor configured to generate a state signal representing whether a flip cover device is in a closed state or in an open state, such that the flip cover device covers or exposes a front surface of the mobile electronic device, respectively;
a memory storing computer-readable instructions;
a processor configured to execute the computer-readable instructions to, activate an cover enable signal and to output information data based on a determination that the flip cover device is in the closed state, and selectively deactivate the cover enable signal based on whether the state signal represents that the flip cover device is in the open state; and a near field communication (NFC) device configured, to switch to a wireless power transmission mode to emit a first electromagnetic wave corresponding to the information data when the cover enable signal is activated, and inhibit emission of the first electromagnetic wave and to switch to an NFC controller interface (NCI) mode to perform an operation defined in an NCI standard, based on the cover enable signal being deactivated.

16. An apparatus, comprising:

a flip cover device configured to at least partially enclose an electronic device, the flip cover device including,
   a back side cover configured to surround a back surface of the electronic device,
   a front side cover configured to selectively cover or expose a front surface of the electronic device, the front side cover including a display module, and
   a connector device that connects the back side cover to the front side cover;

the flip cover device further configured to receive electrical power and information data from the electronic device through a first electromagnetic wave received from the electronic device according to a near field communication (NFC) scheme; and the flip cover device further configured to display the received information data on the display module using the received electrical power, wherein the electronic device includes,
   a sensor configured to generate a state signal representing whether the flip cover device is in a closed state or in an open state;

a memory storing computer-readable instructions;

a processor configured to execute computer-readable instructions to,
   activate a cover enable signal and to output the information data based on a determination that the flip cover device is in the closed state, and
   selectively deactivate the cover enable signal based on whether the state signal represents that the flip cover device is in the open state; and an NFC device configured to,
   switch to a wireless power transmission mode to emit the first electromagnetic wave corresponding to the information data based on the cover enable signal being activated, and
   finish emitting the first electromagnetic wave and switch to an NFC controller interface (NCI) mode to perform an operation defined in an NCI standard, based on the cover enable signal being deactivated.

17. The apparatus of claim 16, wherein, the flip cover device is configured to selectively receive the electrical power and the information data from the electronic device based on the front side cover covering the front surface of the electronic device.

18. The apparatus of claim 16, wherein the flip cover device further includes, a resonance circuit configured to generate an antenna voltage based on the first electromagnetic wave received from the electronic device; and a control chip configured to,
   generate an internal operation voltage based on the antenna voltage,
   obtain the information data based on demodulating the antenna voltage, and
   provide the information data to the display module.

19. The apparatus of claim 16, wherein, the flip cover device includes at least one contact area configured to contact the electronic device, and the at least one contact area exclusively includes one or more electric insulation materials.

\* \* \* \* \*